United States Patent
Willis, Jr. et al.

(10) Patent No.: US 6,738,815 B1
(45) Date of Patent: May 18, 2004

(54) SYSTEMS AND METHODS FOR UTILIZING A COMMUNICATIONS NETWORK FOR PROVIDING MOBILE USERS ACCESS TO LEGACY SYSTEMS

(75) Inventors: Robert H. Willis, Jr., Louisville, KY (US); David R. Jean, Hoover, AL (US); William L. Harris, Lithonia, GA (US)

(73) Assignee: Telcordia Technologies, Inc., Piscataway, NJ (US)

( * ) Notice: Subject to any disclaimer, the term of this patent is extended or adjusted under 35 U.S.C. 154(b) by 0 days.

(21) Appl. No.: 09/343,815

(22) Filed: Jun. 30, 1999

Related U.S. Application Data

(60) Provisional application No. 60/091,373, filed on Jul. 1, 1998.

(51) Int. Cl.[7] .................. G06F 15/173; G06F 15/16
(52) U.S. Cl. .................. 709/225; 709/246; 709/219
(58) Field of Search .................. 709/217, 218, 709/219, 225, 246, 250; 707/104.1; 703/27; 705/34

(56) References Cited

U.S. PATENT DOCUMENTS

| | | | |
|---|---|---|---|
| 5,359,649 A | 10/1994 | Rosu et al. ............ 379/220 |
| 5,521,958 A | 5/1996 | Selig et al. ............ 379/21 |
| 5,570,283 A | 10/1996 | Shoolery et al. ............ 364/407 |
| 5,687,212 A | 11/1997 | Kinser, Jr. et al. ............ 379/10 |
| 5,857,201 A | * 1/1999 | Wright et al. ............ 707/104.1 |
| 5,896,440 A | 4/1999 | Reed et al. ............ 379/1 |
| 5,931,917 A | * 8/1999 | Nguyen et al. ............ 709/250 |
| 6,026,379 A | * 2/2000 | Haller et al. ............ 705/34 |
| 6,233,541 B1 | * 5/2001 | Butts et al. ............ 703/27 |

FOREIGN PATENT DOCUMENTS

EP     0 712 227 A2     5/1996     ............ H04M/3/30

* cited by examiner

*Primary Examiner*—Le Hien Luu
(74) *Attorney, Agent, or Firm*—Glen Farbanish; Joseph Giordano

(57) ABSTRACT

Methods and systems provide a mobile workforce remote access to legacy systems utilizing a wireless communications network with a wireline network available as a backup network. This system includes portable personal computers in communication with the wireless or wireline communications network, protocol servers for receiving and forwarding messages to and from the portable personal computers, and an interface in communications with the protocol servers and legacy systems.

7 Claims, 21 Drawing Sheets

| | PART DESCRIPTION | BIRM | CHARL |
|---|---|---|---|
| 1. | Sun ULTRA E10000 base cabinet, cage for 16 System Boards, Peripheral space with power sequencer. | 1 | 1 |
| 2. | Sun ULTRA E10000 System Board. Without memory processor modules or I/O board | 7 | 6 |
| 3. | 333-MHz Ultra SPARC Module with 4MB External cache | 28 | 24 |
| 4. | Sun ULTRA E10000 Memory Board – unpopulated | 7 | 6 |
| 5. | Sun ULTRA E10000 Dual Sbus I/O daughter card. Optionally available to add (4) Sbus slots to System Boards. | 7 | 6 |
| 6. | 256 MB Memory Expansion (8x 32MB SIMMs) | 28 | 24 |
| 7. | Sun ULTRA E10000 Control Board Including Ethernet Cable and (4) port Ethernet Hub | 2 | 2 |
| 8. | Sun ULTRA E10000 48 volt power supply | 8 | 8 |
| 9. | Sun ULTRA E10000 AC input module | 4 | 4 |
| 10. | Sun ULTRA E10000 fan tray | 16 | 16 |
| 11. | Sun ULTRA E10000 System Service Processor, Sun SPARCstation 5 workstation with 17 inch color monitor, 32 MB RAM, 2.1 BG Inter Fast/Wide SCSI-2 Disk, CDROM Drive and QFE Sbus board | 1 | 1 |
| 12. | North American Keyboard | 1 | 1 |
| 13. | Sun ULTRA E10000 power cord | 4 | 4 |
| 14. | Quad FastEthernet 2.0 Sbus Card; supports Sun Trunking 1.0 software | 3 | 2 |
| 15. | Sun FDDI Sbus Adapter 5.0 Sbus Card, Media, Documentation and single Sbus License SUN FDDI 5.0 Dual – Attach Sbus Adapter (DAS) | 5 | 4 |
| 16. | FC-AL 100MB/sec Sbus Host Adapter with 1 GBIC module mounted in a system cabinet | 5 | 4 |
| 17. | FC-AL 100 MB/sec GBIC module mounted in a system cabinet | 5 | 4 |
| 18. | Enterprise A5000 Storage Expansion Cabinet | 2 | 2 |
| 19. | Enterprise A5000 Storage system hot-swap power supply | 3 | 2 |
| 20. | FC-AL 100 MB/sec Optical to Electrical hot swap module mounted in an Enterprise A5000 Storage Expansion Cabinet | 6 | 4 |
| 21. | 127.4 GB Sun StorEdge A5000 (14 X9.1 GB, 7200 rpm FC-AL drives) rackmount configuration with 2 meter Fibre Channel cable mounted in expansion cabinet | 3 | 2 |
| 22. | 15 meter Fibre Optic Cable | 6 | 4 |
| 23. | Sun StorEdge A5000 power cord | 2 | 2 |
| 24. | North American/ Asian localized power cord | 3 | 2 |
| 25. | 72-144GB 4mm DAT DDS-3 Tape Autoloader, FlexiPack for us in FlexiPack removable storage tray – factory configured into Ultra Enterprise Expansion Rack | 1 | 1 |
| 26. | Sun Server Software – Solaris 2.5.1 unlimited users, Alternate Pathing 2.0, Netbackup, System Service Processor 3.1 (Sun SPARCstation 5 only) | 1 | 1 |
| 27. | Commkit Adapter Cards for datakit interface | 3 | 2 |

FIG. 21

SYSTEMS AND METHODS FOR UTILIZING A COMMUNICATIONS NETWORK FOR PROVIDING MOBILE USERS ACCESS TO LEGACY SYSTEMS

RELATED APPLICATIONS

This application claims priority to Provisional Application No. 60/091,373 filed Jul. 1, 1998 entitled, "System and Method for Providing Access to Legacy Systems," which is incorporated by reference herein.

FIELD OF THE INVENTION

The present invention relates in general to the field of telecommunications dispatching systems and in particular to the field of wireless and wireline communications providing mobile personnel access to legacy systems and other remote systems.

BACKGROUND OF THE INVENTION

Telecommunications technicians perform a variety of functions for telecommunications companies. Among the critical functions they serve includes providing on-site installation and maintenance service support to customers. While on the customers' premises and when preparing for a customer visit, mobile personnel such as technicians need access to a variety of data, and systems such as, facility assignments, network testing functions, maintenance processes and procedures and customer specific information. Typically, the remote systems provide access to systems such as dispatch, facilities, and billing systems.

Regularly, technicians receive job assignments, travel to the customers' location, and complete the assignment. To effectively complete their job duties, technicians utilize computers to remotely access the required databases. Normally, the technicians remotely access the legacy systems to retrieve the necessary information. For the Regional Bell Operating Companies (RBOC), the legacy systems include a collection of databases established by the Bell System and currently managed by BellCore provide critical information necessary for technicians to complete their job duties.

Currently, RBOC installation and maintenance technicians access the legacy systems necessary to perform job tasks through the Craft Access System (CAS) gateway.

CAS provides technicians with the capability to remotely access operations systems while at the customers' premise performing work activities such as installation and maintenance of facilities. The primary operations functions accessible to a technician on the CAS network include receiving new work assignments, information on current work assignment, facility testing, and electronic mail.

CAS provides access to many of these functions though a variety of legacy systems. Legacy systems include Loop Facility Assignment Control System (LFACS), Loop Maintenance Operations System (LMOS), Computer System for Main Frame Operations (COSMOS), Mechanized Loop Testing (MLT), Secure Network Element Contract Server (SNECS), Mechanized Time Reporting (MTR), OutSide Plant Construction Management (OPSCM) and Work Activity Statistical Sampling Plan (WASSP). Each of these systems provides vital data to technicians.

LFACS, a part of the Facility Assignment and Control System (FACS) is primarily responsible for completing outside plant facility assignments. COSMOS provides methods to effective manage, control and utilize main central office distributing frame facilities and circuits. This is accomplished by automating the assignment of central office equipment, telephone numbers, and frame cross connections. A selected sample of outside plant technicians are selected each month to utilize WASSP to report how much time they spend doing different tasks on each job they complete. This data is verified and sent to the MTR system.

LMOS is further delineated into LMOS Host and LMOS Front End (FE). LMOS Host stores and maintains detailed line record information. It also creates and maintains historical data on closed trouble reports. LMOS FE provided mechanized methods of maintaining customer line records and mechanized capability for entering, processing and tracking trouble reports. MLT is an automated loop testing system available through LMOS FE. It is used to test loops equipped with one-party and commercial services such as Private Branch Exchange (PBX) and Central Office Centrex. SNEC is a security interface. OPSCM is designed to manage outside plant construction from end to end. It encompasses contracts, contractors, job management, complaints, billing and payments, and informational reporting. These systems provide the required data utilized by technicians to install and maintain services.

While CAS provides access to legacy systems, CAS has limitations. CAS is a Lucent Technologies proprietary system, which in some versions is expected to be unable to function beyond the year 2000. CAS requires technicians to use a dial-up connection to access the information systems they need to perform their job, requiring them to find dial tone. Currently, technicians access CAS utilizing Computer Access Terminals (CATs), also referred to as "the brick". CATs require technicians to use a dial-up connection to transmit data at 1.2 kbps. This process restricts the technicians mobility while using the system. The technician must either gain permission of a customer to tie up their phone line or leave the customer premise, drive to a location where the technician can plug in a computer terminal and log in. Technicians are placed in the position of either tying up a customers' phone or driving to find dial tone. Both are inefficient methods of communicating with the network.

Moreover, after finding dial tone, logging into CAS takes appropriately three minutes. Additionally closing a service order with a CAT takes at least five minutes. Viewing a record on line with the CAT could take more than five minutes. In other words, CATs are slow. CATs are DOS based script orient computers with no memory, i.e. it is a dumb terminal. Only a single task is available at a time utilizing CAT.

Further, with CAS a technician can only download information on four facility pairs available to the customer. If all four pairs are not working, the technician cannot complete the customers' order.

Moreover, access to LMOS through CAS is cumbersome. LMOS provides critical customer information and serves as a tracking mechanism for trouble reports and expectedly, technicians frequently access LMOS. Currently, at the server ends of the CAS system, each LMOS request is processed separately resulting in large amounts of traffic across the network requesting access to LMOS thereby burdening the network.

SUMMARY OF THE INVENTION

The present invention addresses the problems associated with CAS technician dispatch systems and provides additional capabilities and features not available utilizing CAS. The methods and systems of this invention provide for a Year 2000 compliant distributed client-server application for mobile personnel with reliable and secure access to remote systems, such as legacy systems. The preferred system associated with this invention for discussion purposes will be referred to in a non-limiting manner as TechNet.

Generally, the TechNet system includes portable personal computers in communication with a wireless or wireline communications network, protocol servers for receiving and forwarding messages to and from the portable personal computers, the protocol servers in communications with a TechNet server in communications with legacy systems and other remote systems.

In the preferred embodiment, the technicians are equipped with ruggedized notebook computers that provide two-way wireless and wireline communication. Data can be transmitted up to 33.6 kbps via wireline connections and up to 8 kbps wirelessly. Wireless service utilized by the technicians to connect to the TechNet servers is preferably through the BellSouth Wireless Data Network (BSWD) although other wireless networks may be used. Wireline service or dial-up service utilized by the technicians to connect to the TechNet servers is through the BellSouth Communications Network (BSCN) but again other wireline networks may be used.

Protocol servers, preferably manufactured by NetTech, provide protocol conversion and middleware service in the TechNet system.

The TechNet server provides for receiving user requests, authenticating user access, servicing user requests, generating legacy system transactions, providing an interface and emulation to legacy systems, receiving results from the legacy systems and sending results back to the users portable PC.

Legacy systems contemplated as part of this invention for RBOCs include but are not limited to, Loop Facility Assignment Control System (LFACS), Loop Maintenance Operations System (LMOS), Computer System for Main Frame Operations (COSMOS), Mechanized Loop Testing (MLT), Secure Network Element Contract Server (SNECS), Mechanized Time Reporting (MTR), and Work Activity Statistical Sampling Plan (WASSP).

Using a system which employs wireless technology will enable technicians to perform job tasks with a greater degree of mobility, and a time savings over the previous systems, beyond the end of the century. A ruggedized laptop personal computer provides a flexible platform which enables future improvements in information systems and allows the technician to provide better service to customers.

Objects of this invention include:

To provide users in the field providing customer service with access to remote systems, such as legacy systems.

To provide technicians with a system for receiving and closing out trouble tickets, work orders, testing, identification and repair of customer lines.

To provide a dispatch system that is Year 2000 compliant.

To provide a dispatch system that provides for immediate input and close-out of customer service requests.

To provide a dispatch system having wireless access to legacy and other remote systems.

To provide technicians with high speed access to legacy and other remote systems.

To provide technicians a windows based interface with remote access to legacy and other systems.

To provide a more efficient method for processing messages and inquiries into remote systems.

Other objects, features and advantages of this invention will be set forth in part in the description which follows and in part will be obvious from the description or may be learned by practice of the invention. The objects, features and advantages of this invention will be realized and attained by means of the elements and combinations particularly pointed out in the claims.

BRIEF DESCRIPTION OF THE DRAWINGS

FIG. 21 shows an example of TechNet server components utilized in each data center.

DETAILED DESCRIPTION OF THE INVENTION

Reference will now be made in detail to preferred embodiments of the invention, examples of which are illustrated in the accompanying drawings. Whenever possible, the same reference numbers will be used throughout the drawings to refer to the same or like parts.

I. Overview of Systems and Methods

This invention includes systems and methods for providing personnel, such as technicians, with processors capable of remotely accessing legacy systems and other remote systems over a communications network. The communications network may include a wireless network and a wireline network available as a backup network when personnel are unable to utilize the wireless network. Moreover, the communications network includes a variety of networks, for instance local, long distance, and cable networks.

The systems and methods disclosed are not limited to local telecommunications company applications. Providing remote access to databases for other service providers such as cable providers, utility companies, internet service providers, wireless network providers, and long distance companies, that provision and maintain, for example, coaxial cable, fiber optic cables and copper facilities is within the scope of this invention.

II. Overview of System

Figure 1:
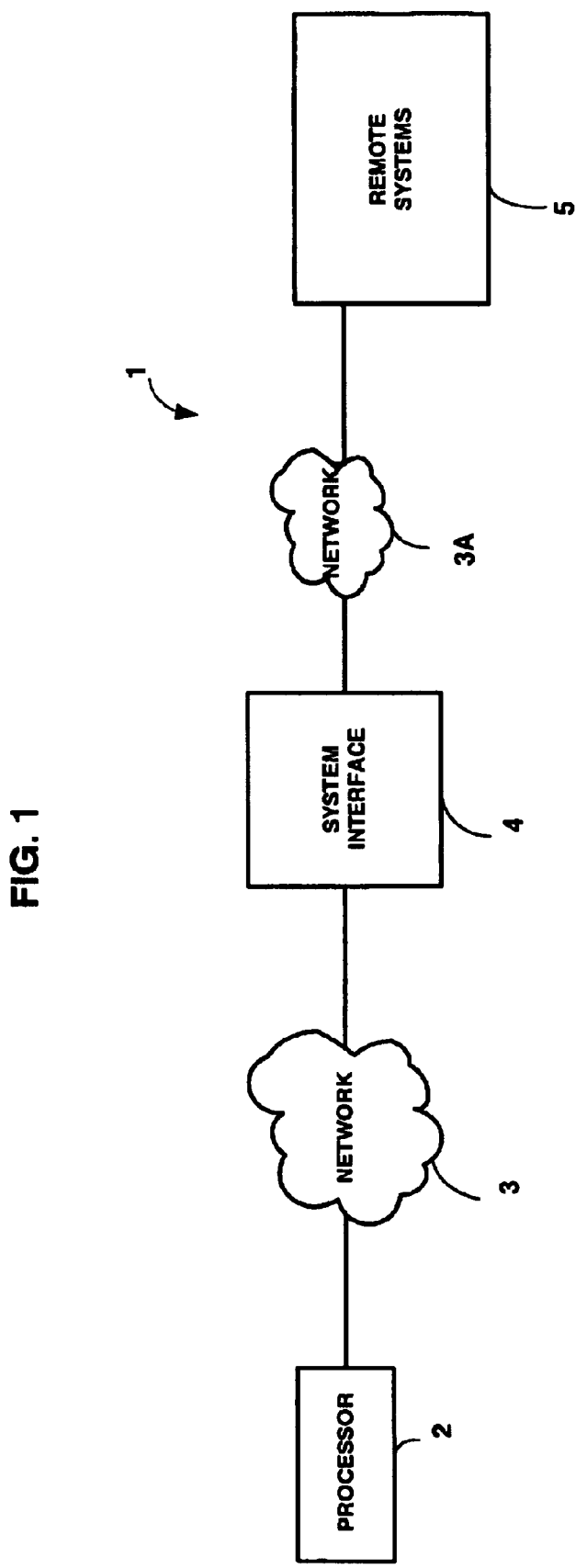
FIG. 1 presents a broad overview of a system 1 for providing personnel remote access to legacy systems in accordance with a preferred embodiment of this invention.

FIG. 1 presents a broad overview of a system 1 for providing personnel, such as a mobile workforce, access to remote systems in accordance with a preferred embodiment of the invention. The system 1 includes a processor 2, a communications network 3, a system interface 4, a network 3A and remote systems 5.

Figure 2:
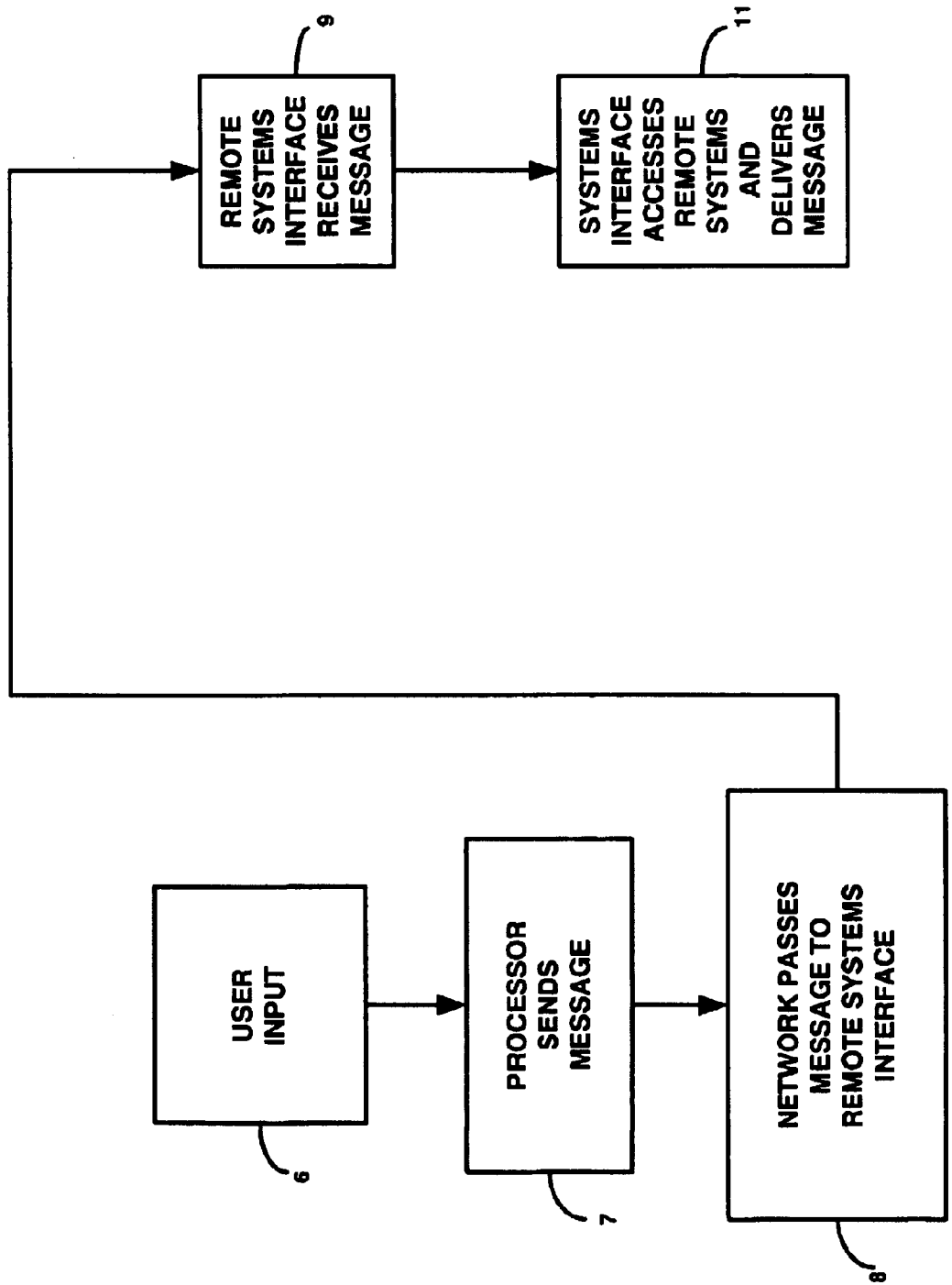
FIG. 2 shows a high-level flow chart of the processes utilized by the system 1 of FIG. 1.

FIG. 2 shows a high-level flow chart of processes utilized by the system 1 of FIG. 1. User input at 6 triggers transmission of a message to the remote systems 5. The user, for example a technician, accesses the processor 2 that sends the message to the network 3. The message may provide data to the remote system 5 and/or may request information from the remote system 5. At 8, the network 3 passes the message to the system interface 4. The system interface 4 receives the message at 9. Additionally, at 9 the system interface 4 accesses the remote systems 5 and delivers the message. If the message is a request for information, then retrieved data is delivered to the user at 11 by sending the message through the network 3 to the processor 2.

III. Preferred System Overview

Figure 3:
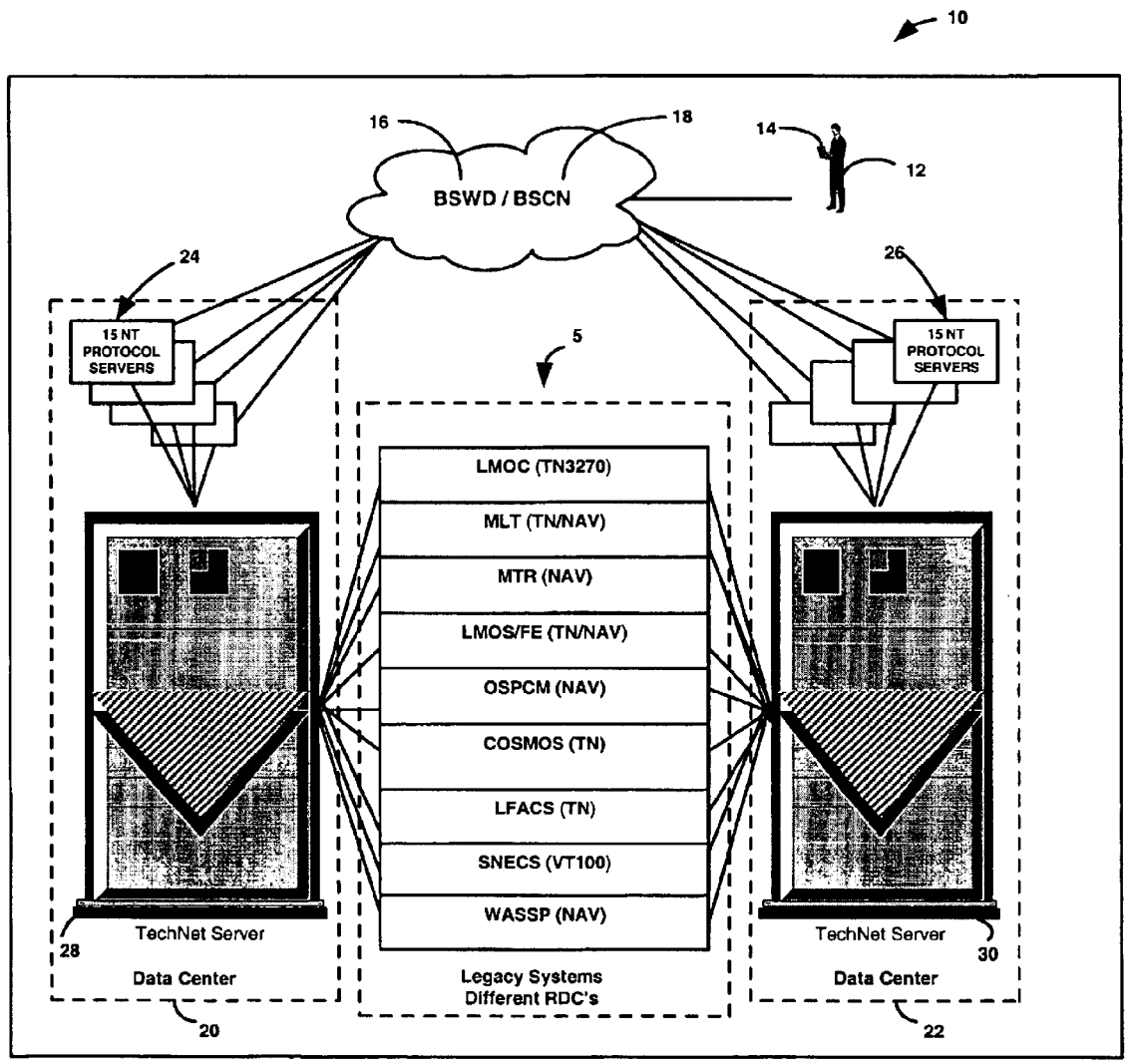
FIG. 3 shows an overview diagram of an architecture of a TechNet system according to a preferred embodiment of this invention.

FIG. 3 presents an overview of a preferred architecture of a TechNet system 10 including apparatus and methods for retrieving customer-related data in system, such as legacy systems, in a wireless and/or wireline communications network according to one aspect of this invention. The processor 2 of FIG. 1 is preferably a personal computer, and the network 3 is preferably provided by BellSouth. The system interface 4 is preferably an arrangement of servers.

Mobile personnel, such as a technician 12 utilize applications on a portable personal computer (PC) 14 to gain access to a BellSouth wireless (BSWD) 16 or wireline network (BSCN) 18. In a preferred embodiment, the technicians' 12 message can be served from one of two data centers 20, 22 based on the location and access permissions established for the technician 12. An array of individual protocol servers 24, 26 act as agents between the PC 14 and TechNet servers 28, 30. The TechNet servers 28, 30 receive, authenticate, and service user requests, generate legacy systems 5 transactions, receive results from the legacy systems 5 and send results back to the PC 14. The TechNet system 10 and methods carried out by the TechNet system 10 include three main components: (1) the TechNet client PC; (2) the TechNet communications network, including the wireless and wireline network; and (3) the TechNet server.

A. TechNet Client PC

The PC 14 encompasses a TechNet client application that provides a computer interface for TechNet users for allowing remote access to various remote systems, such as legacy systems. For an RBOC, the system 10 preferably provides access to LFACS, LMOS, COSMOS, MLT, SNECS, MTR, OSPCM and WASSP. It should be understood that the system 10 is not limited to these remote systems but that access may be provided to other legacy systems and to non-legacy systems.

Figure 4:
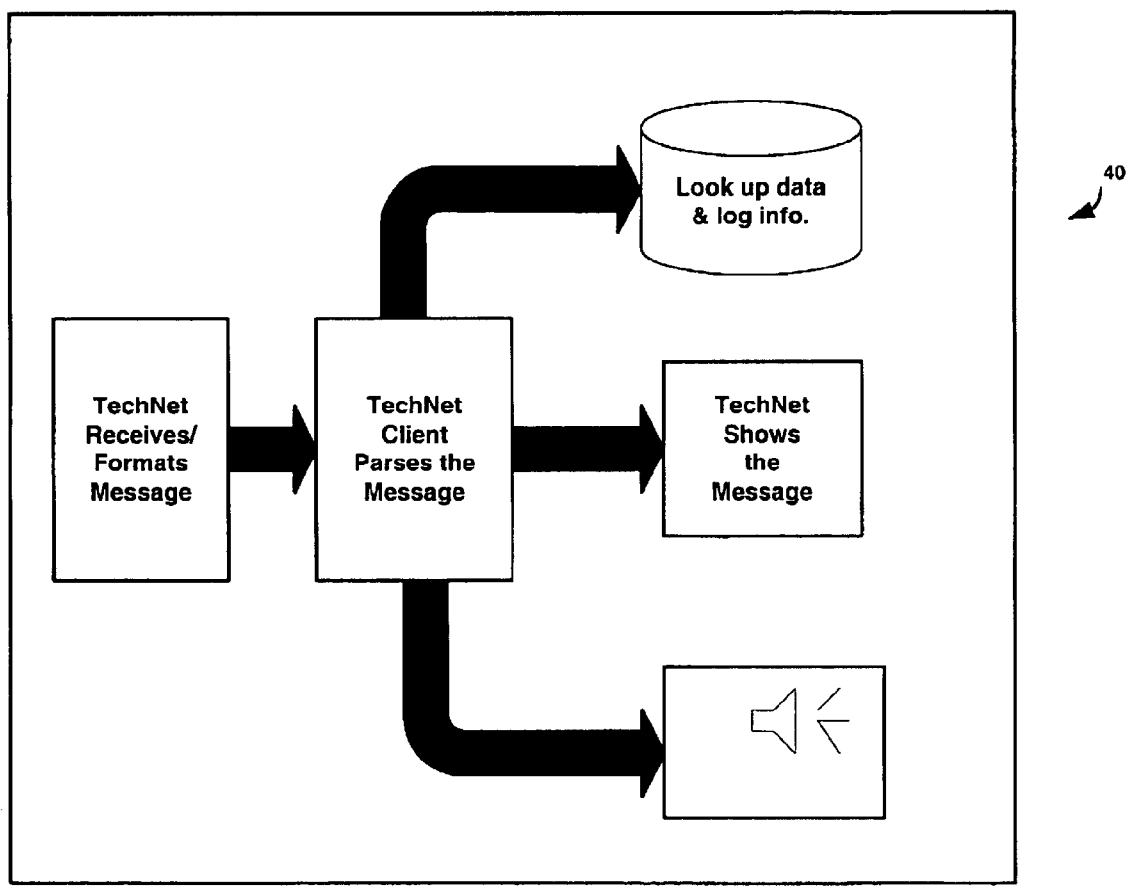
FIG. 4 shows a flow diagram of a TechNet client application.

FIG. 4 shows a flow diagram 40 of the TechNet client application. The TechNet client application recognizes a user request, formats it and sends it to the server for processing. On return, the data is received by the TechNet client application, parsed, and displayed to the user. A windows based operating system, is utilized as the underlying platform on which the portable PC 14 executes its functionality. Preferably, Microsoft Windows 95 is the operating system, but this invention is not limited to Microsoft Windows 95. Microsoft Windows 95 provides multi-tasking, memory-allocation, and some error-handling between different components. Microsoft Windows 95 allows dissimilar applications to share data and supports Dynamic Data Exchange (DDE), which allows applications to share data dynamically.

Figure 5:
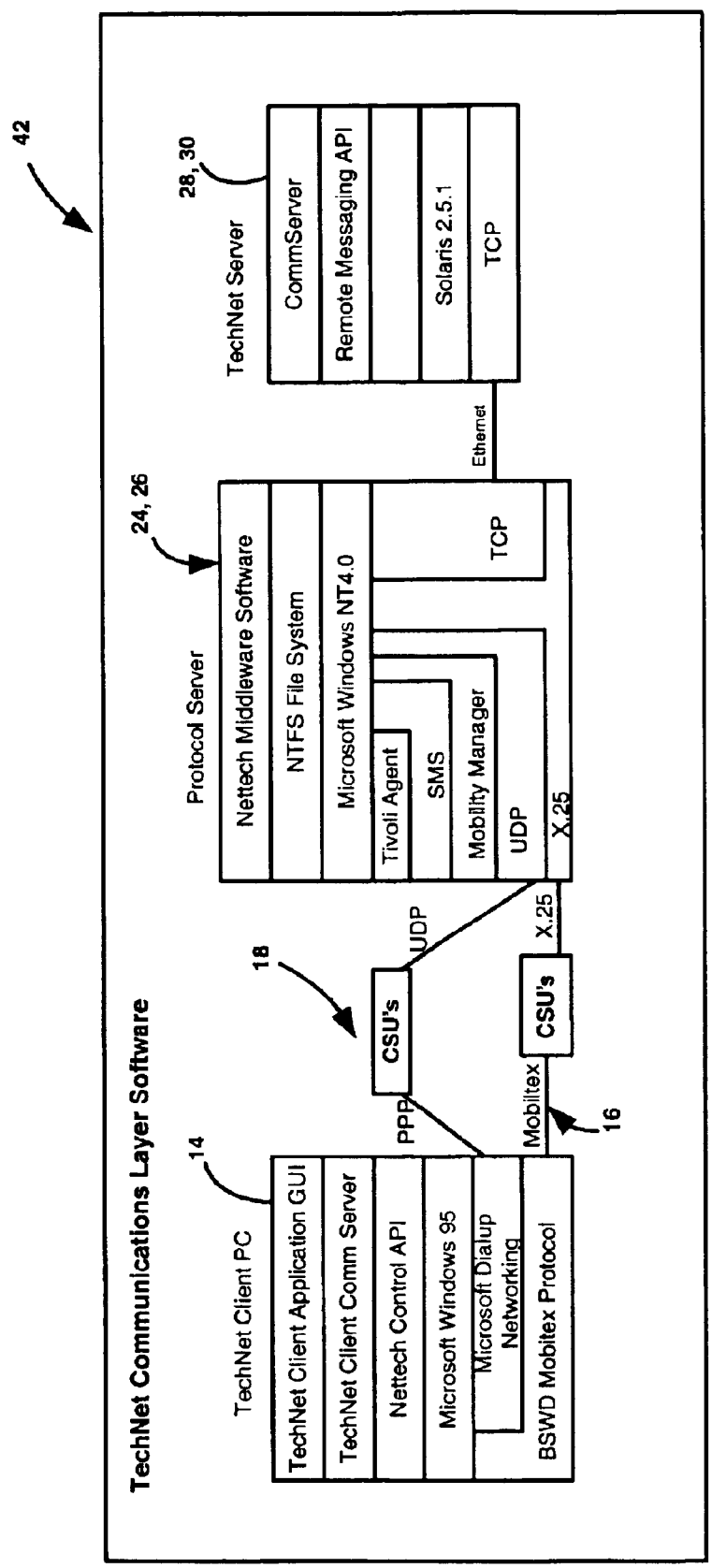
FIG. 5 shows an overview of the TechNet communications layer software configuration.

FIG. 5 shows an overview of a TechNet Communications layer software configuration 42. FIG. 5 shows the main software components of the portable PC 14, protocol server 24, 26 and the TechNet server 28, 30. These software components all work together to provide some functionality of the TechNet system 10.

In a preferred embodiment, the portable PC 14 includes an Itronix PC. Itronix PCs are rugged laptops adapted to include a Motorola radio modem for communicating with the BSWD 16 utilizing a Mobitex protocol, a 33.6 kbps wireline modem for communicating via the BSCN 18 utilizing PPP protocol, Microsoft Windows 95 operating system, TechNet client applications, NetTech middleware software for sending and receiving transactions, and Microsoft Access for providing database access for logging and retrieving data from a client database. Each PC 14 may contain one of the following feature sets: 8.2" monochrome VGA display with BSWD radio modem; 8.2" monochrome VGA display without BSWD radio modem; 10.4" color SVGA display with BSWD radio modem; or 10.4" color SVGA display without BSWD radio modem. In one application of the invention, approximately 15,000 technicians 12 will be deployed each utilizing a portable PC 14 on the TechNet system 10. The client database stores user and transaction related data, which can be accessed by an administrator in case of a problem or to run client-specific reports. This database primarily logs errors, client performance, and other application related data specific to each client application. Administrators can remotely upload this data to the server on request.

A TechNet GUI layer enables the TechNet System 10 to manage the user-to-computer interface, capture user interactions, generate events, present data to the user, assist in the management of the dialog flow, enable the TechNet client PC to collect information from the user, edit it, perform basic validation, and coordinate activities across fields in a window. A TechNet client database stores user and transaction related data that is remotely assessable by an administrator, logs errors, contains client performance related data and application specific data for client applications. The comm layer enables the TechNet client to transparently interact with the TechNet server regardless of the specific physical network employed.

Once parsed by the TechNet client, the message is sent to the comm layer to be sent to the TechNet server. The PCs' 14 comm server module handles communications with the TechNet server 28, 30. The comm server is a Dynamic Link Library (DLL) that utilizes NetTechs' control API to provide access to both the wireless and wireline networks. The control API includes functions for connecting to the network, sending and receiving messages, disconnecting from the network and providing access to information such as radio signal strength and battery power level. On return, when the TechNet server sends data to the TechNet client, the comm server parses the data and adds any information needed from the database to make the message displayable to the PC 14. It also logs any message specific information to the database and then displays the information, providing an audio message to notify the user. The comm server shields an application logic layer from any changes related to the middleware software.

A VT100 session provides access to DISC*C, a fiber digital loop carrier system. This session requires a direct connection to a Central Office Terminal (COT), Remote Data Terminal (RDT), or Optical Network Unit (ONU).

The TechNet system can be supported by a wireless and a wireline network to provide convenient full coverage to users.

The TechNet middleware is software for the protocol server used for transmission of data between client and server. The Middleware can support multiple types of networks (such as RF or land line) and multiple protocols, (e.g. TCP/IP, X25, PPP, etc.). The middleware provides the TechNet System 10 with synchronous as well as asynchronous modes of transmission. The middleware software provides the required network session establishment and management functionality. Middleware software also provides low-level protocol frame recovery, and in some cases provides re-transmission in the event of a local or remote communications failure. A NTFS file system provides system optimization. Preferably, each of the 15 protocol servers is grouped in a cluster of 3–5 protocol servers that share a NTFS file server located on one of the cluster. Additionally, the middleware also provides message compression, decompression, and any segmentation required to satisfy protocol or other communication constraints. The middleware software is preferably provided by NetTech.

The protocol servers 24, 26 preferably run a Microsoft Windows NT 4.0 workstation operating system that hosts an Remote Messaging API server and RFexpress middleware components. RFexpress server software transmits data from the message queue to both the wireless and wireline networks. A RFexpress instance is required for BSWD and for BSCN. A Tivoli Agent on the protocol server 24, 26 collects information about the current status and performance of the protocol server. The Tivoli Agent exports this data to a Tivoli management station, which is responsible for providing a user interface for viewing this data. A mobility manager enables administrators to monitor statistics from each protocol server 24, 26.

These systems provide the required data utilized by the technician to install and maintain services. A comm server component of the TechNet server application is responsible for communications between the TechNet server 28, 30 and the PC 14. A remote messaging API client communicates with remote messaging API server on the protocol server 24, 26, and routes messages in the TechNet system 10. Solaris refers to UNIX Solaris 2.5.1 operation system that runs the TechNet server 28, 30. A message queue is utilized to transmit messages between the TechNet server 28, 30 and the protocol servers 24, 26. The message queue resides on a flat file system on the TechNet host.

B. TechNet Communications Architecture

Figure 6:
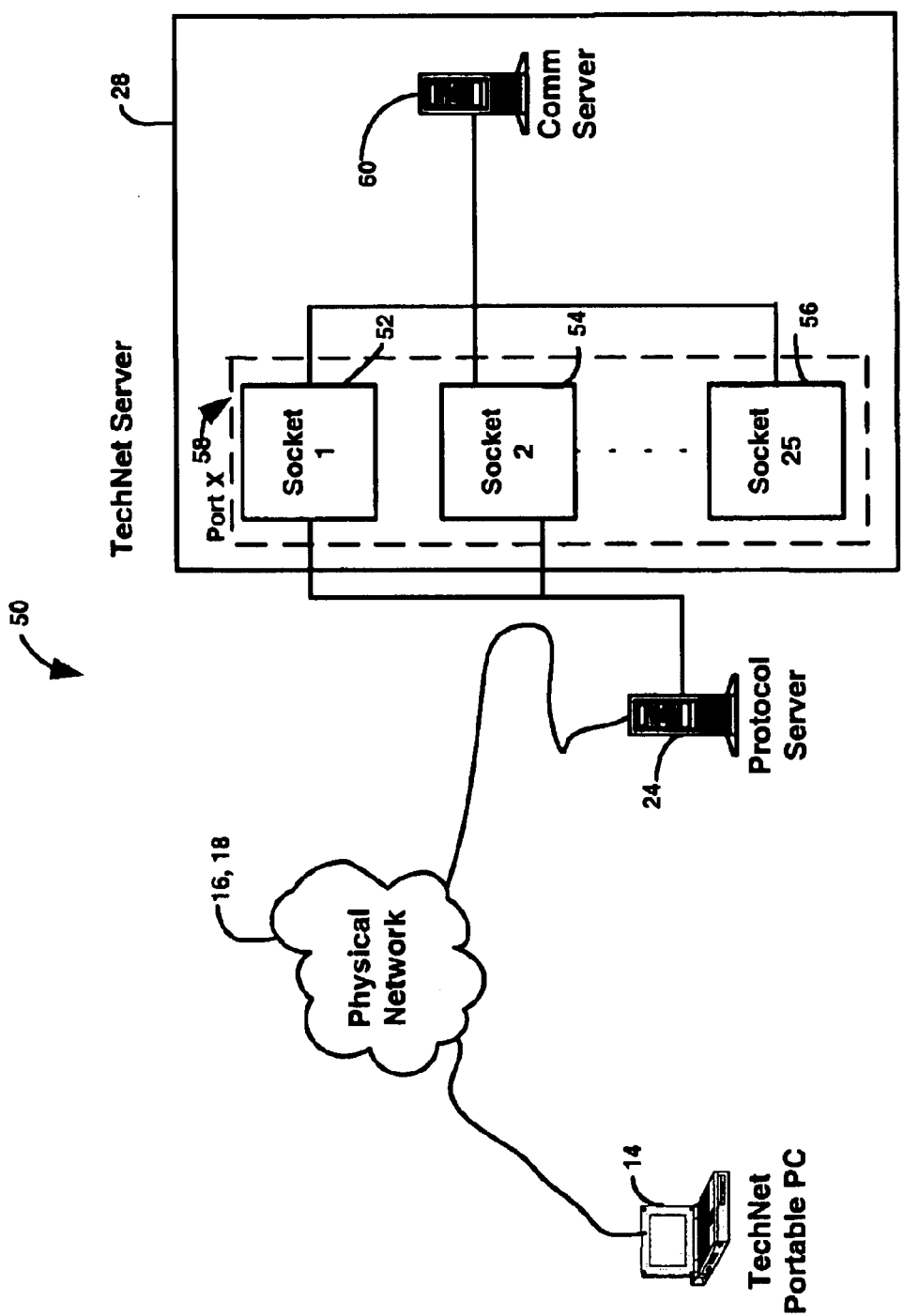
FIG. 6 shows a diagram of an architecture including a TechNet portable PC in communication with a protocol server utilizing a communications network.

FIG. 6 shows an overview of the TechNet communications architecture 50. The TechNet communications architecture 50 provides for initiation of connections from a PC 14 through a wireless network and/or a dialup network to the Tech Net server 28, 30. The TechNet communications architecture 50 establishes and maintains host connections to the wireless network and provides for re-routing of calls in the event of a failure.

In operation, the protocol server address is determined using a load-balancing algorithm, preferably round robin. On message arrival, a process on the protocol server 24 detects and receives the message (sent from the portable PC 14) via an I/O port, such as but not limited to X.25 or TCP/IP. The process then verifies the sender and receiver information. All the senders, as well as receivers, are registered with the protocol server 24. If the information is valid, the message is placed in the receivers' queue.

In another process, a message router has a block on the queue activities and recognizes that a new message has arrived. The message router picks the message and places it on one& of the sockets 52, 54, 56 of the TechNet Server 28 service I/O ports 58.

The preferred process uses load-balancing algorithms to place the message on the queue since there are 25 sockets available per I/O port 58 and one or more ports of the TechNet Server 28 are registered with the protocol servers 24. Therefore, when one of the ports becomes unavailable, the protocol server process places the message on a socket of one of the available ports.

TechNets' communication architecture 50 is responsible for all facets of transporting data between the TechNet servers 28, 30 and the portable PCs' 14. Middleware 42 is utilized for sending data between remote portable PCs' 14 and the centralized TechNet servers 28, 30. TechNets' communications architecture 50 can be grouped into: (1) the wireless network 16; (2) the wireline network 18; and (3) protocol servers 24, 26, and TechNet servers 28, 30 and PCs 14.

1. Wireless Network

Figure 7:
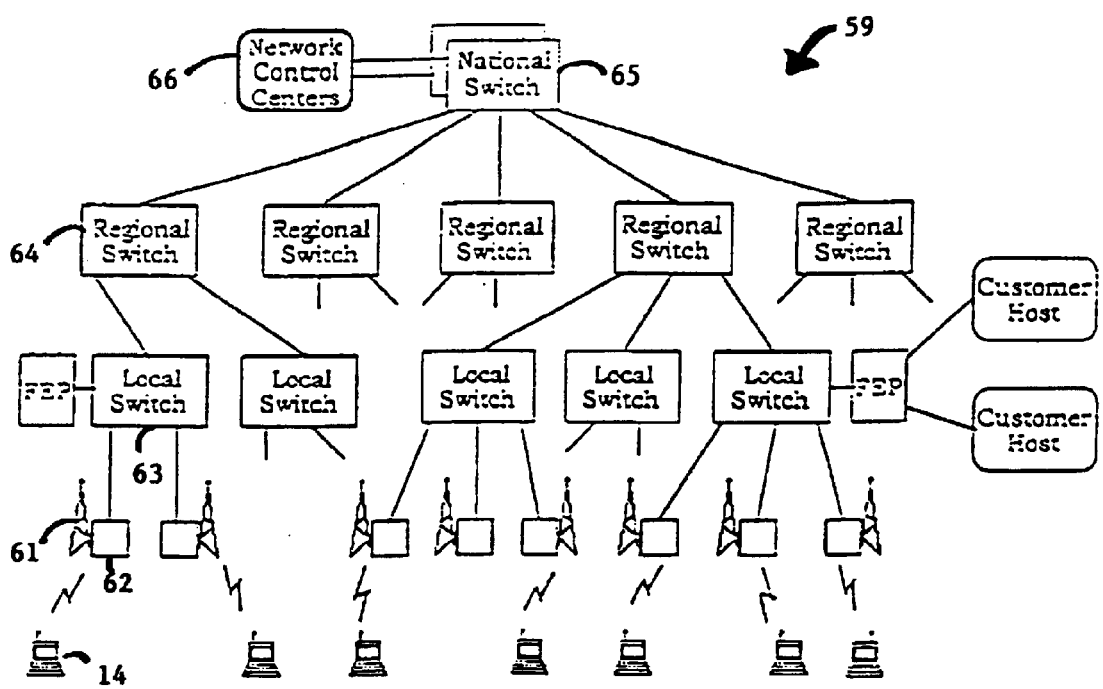
FIG. 7 shows an embodiment of the BellSouth Wireless network (BSWD) switching network.

FIG. 7 shows an embodiment of a BSWD switching network 59. The wireless network is responsible for providing connectivity between the protocol servers 24, 26 and the portable PCs' 14 using the BellSouth Wireless Data Mobitex 16 network. The BSWD 16 is a nation-wide public packet-switched wireless network. BSWD 16 is organized in an hierarchical structure, which provides for routing traffic throughout the entire network 59. The actual radio towers 61 are controlled by base stations 62, which are then connected to a local switch 63. The local switches are controlled by regional switches 64, which are then connected to a top level node 65. The entire network 59 is monitored and controlled by network control centers 66.

Figure 8:
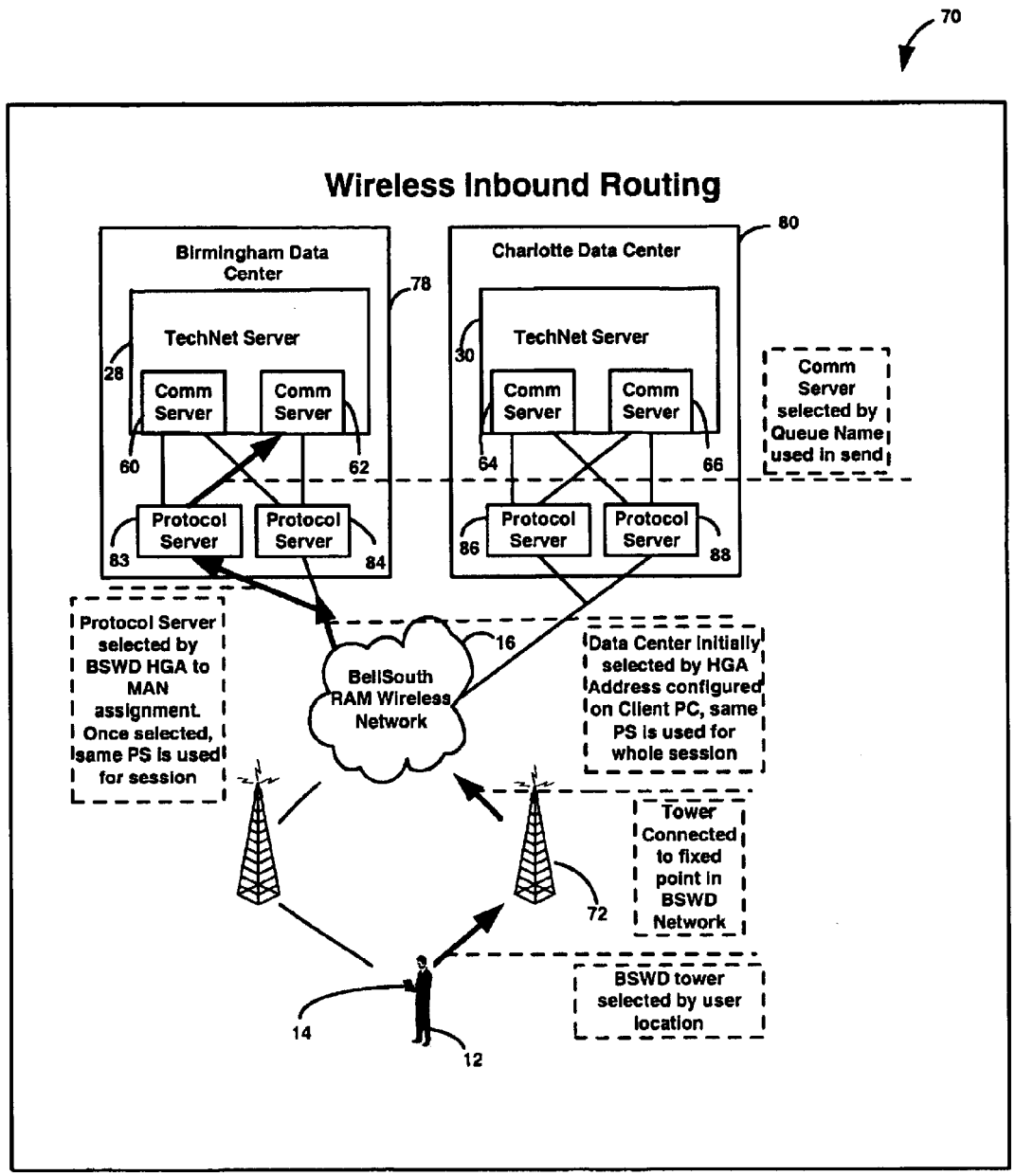
FIG. 8 shows a wireless inbound routing configuration.

FIG. 8 shows a wireless inbound routing configuration 70. The portable PC 14 selects a BSWD tower 72 based on location of the technician 12. The tower 72 connects to a fixed point in the BSWD 16 network. The message switches through the BSWD 16 to an appropriate protocol server 83, 84, 86, 88 selected by BSWD Host Group Address (HGA) to MAN assignment. Once selected, the same protocol server 83 is used for the session. Likewise, the data center initially selected by the HGA address configured on the portable PC 14 is the same protocol server 83 used for the entire session. The comm server 62 of the TechNet 32 server is selected by a queue name used in the send request by the portable PC 14.

The technician 12 utilizing his portable PC 14 logs into a protocol server 83 using his current user ID and primary host group address (HGA). The HGA specifies the users' designated protocol server 83 group which determines to which data center 78, 80 the user should connect. The BSWD 16 and the middleware 42 coordinate assigning a specific protocol server 83 from within a protocol server array 24, 26 specified by the HGA. Messages sent to the TechNet server 30 are addressed to the specified TechNet Server queue name.

Figure 9:
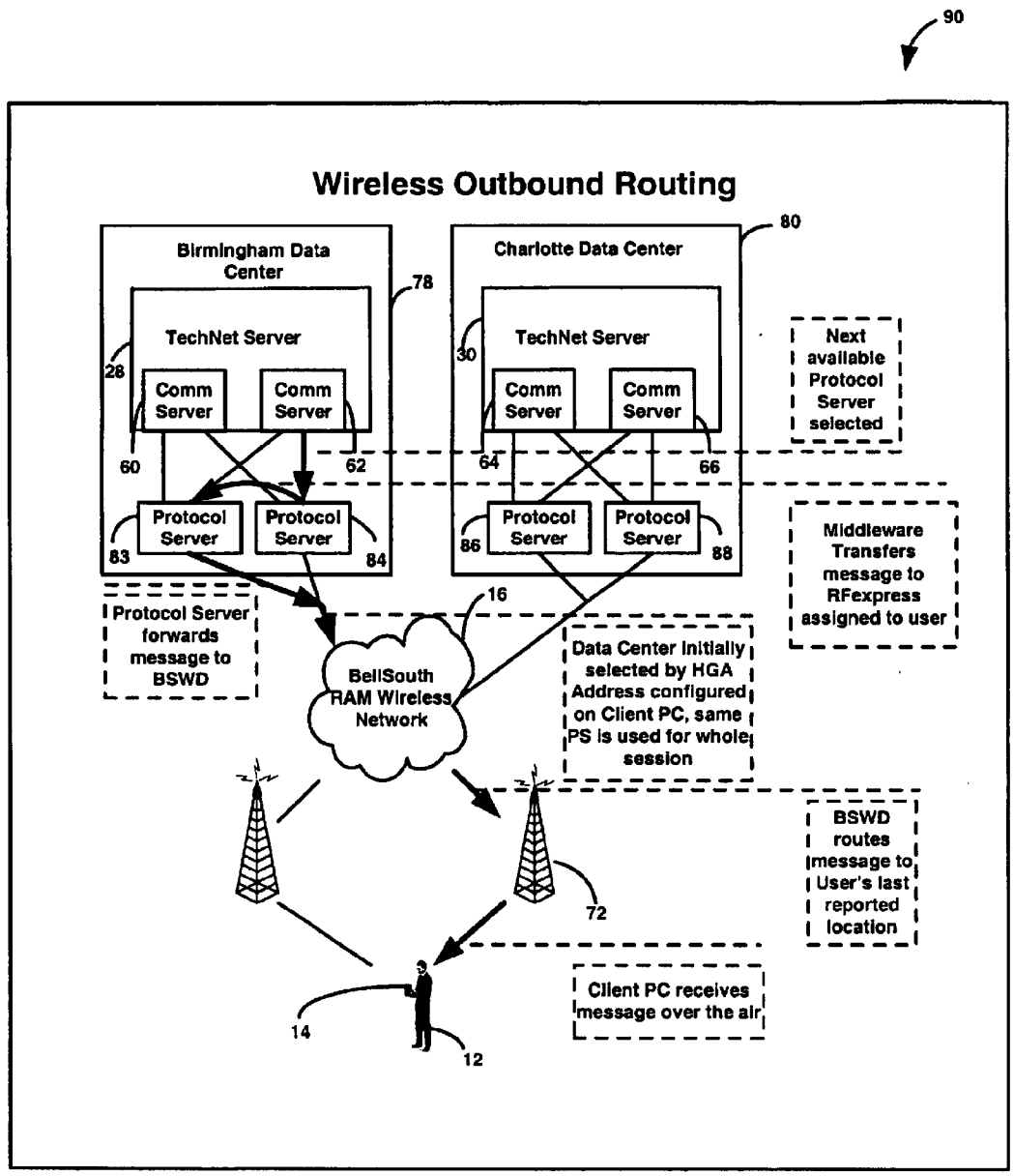
FIG. 9 shows a wireless outbound routing configuration.

FIG. 9 shows a wireless outbound routing configuration 90. The TechNet server 28 selects the next available protocol server 83, 84. The middleware 42 transfers the message to the RF express assigned to the user. The protocol server 83 forwards the message to the BSWD 16. BSWD 16 routes the message to the user's last reported location. The portable PC 14 receives the message over the air. Messages sent from the TechNet server 30 to the technician need only be addressed to the specific user ID. The middleware routes messages to the correct protocol server 83 and to the designated user.

Figure 10:
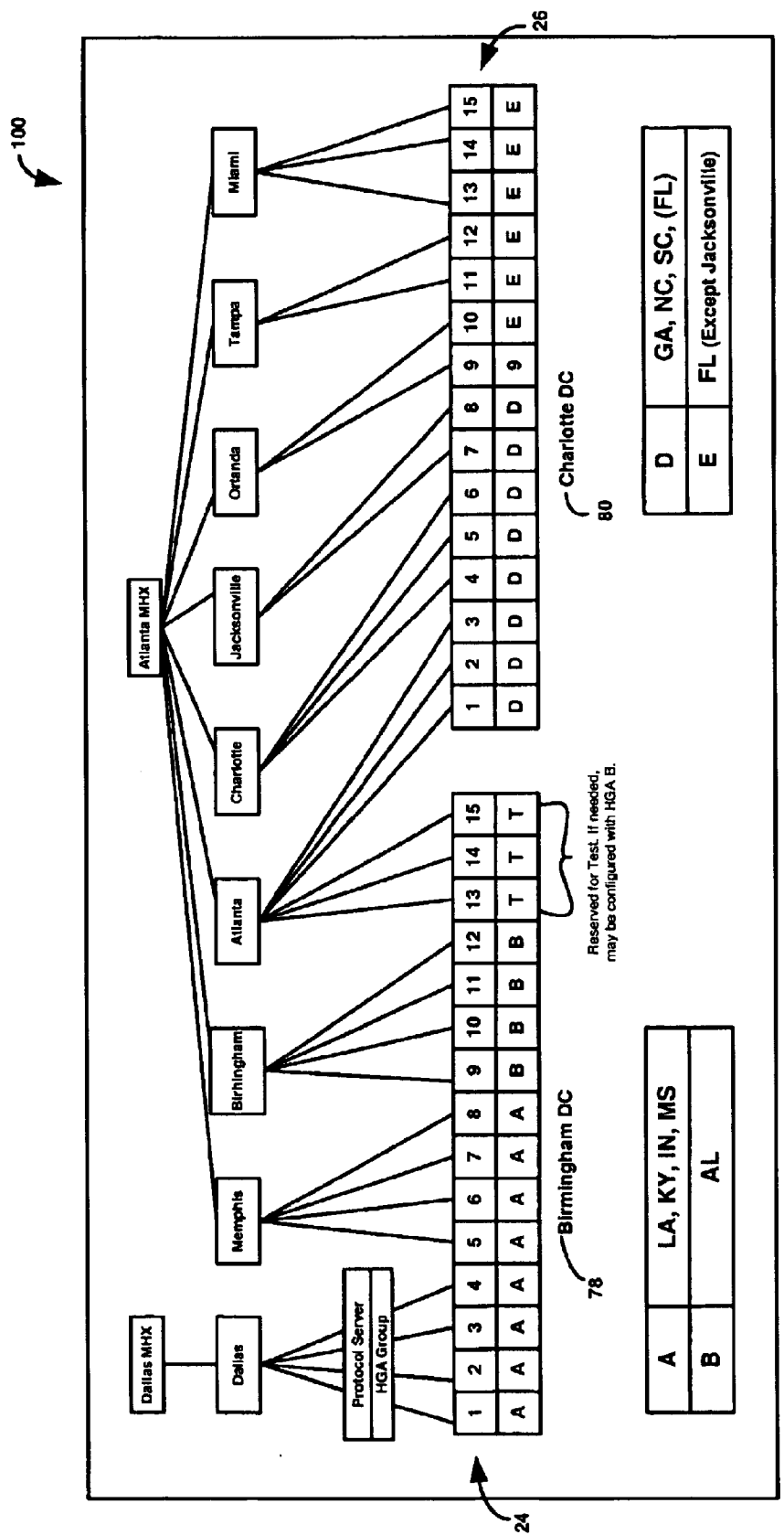
FIG. 10 shows an example of a Host Group Addressing (HGA) configuration.

FIG. 10 shows an example of a HGA configuration 100. Each data center 78, 80 has fifteen protocol servers 24, 26 sized to support the entire load of technicians, for example 15,000 technicians 12. Both data centers 78, 80 share a single HGA address. HGA addressing is a networking option that allows for multiple host connections to be addressed by a single address, providing redundancy, which in turn increases reliability and capacity. Every technician 12 can communicate to any of the closest available protocol server 24, 26 by referencing a single HGA address. In the event that all of the protocol servers 24, 26 serving a given local switch fail, HGA routing will automatically send traffic to the next closest group of protocol servers 24, 26.

2. Wireline Network

The wireline network is preferably a backup network, but could alternatively be a primary network, responsible for passing data between the protocol servers 24, 26 and portable PCs' 14 using dial-up connections. The wireline network portion of the TechNet System 10 architecture provides access in locations that do not have adequate wireless coverage. Wireline provides a highly available and secure dial-up access point for users into BellSouths' TCP/IP data network. The wireline network furnishes TechNet users with dial-up IP access to the TechNet protocol servers 24, 26 via the Bell System Communications Network (BSCN). Once IP connectivity is established, the flow of traffic between the remote portable PCs' 14 and the protocol servers is managed by the middleware resident on the portable PC 14 and the protocol server 24, 26.

Figure 11:
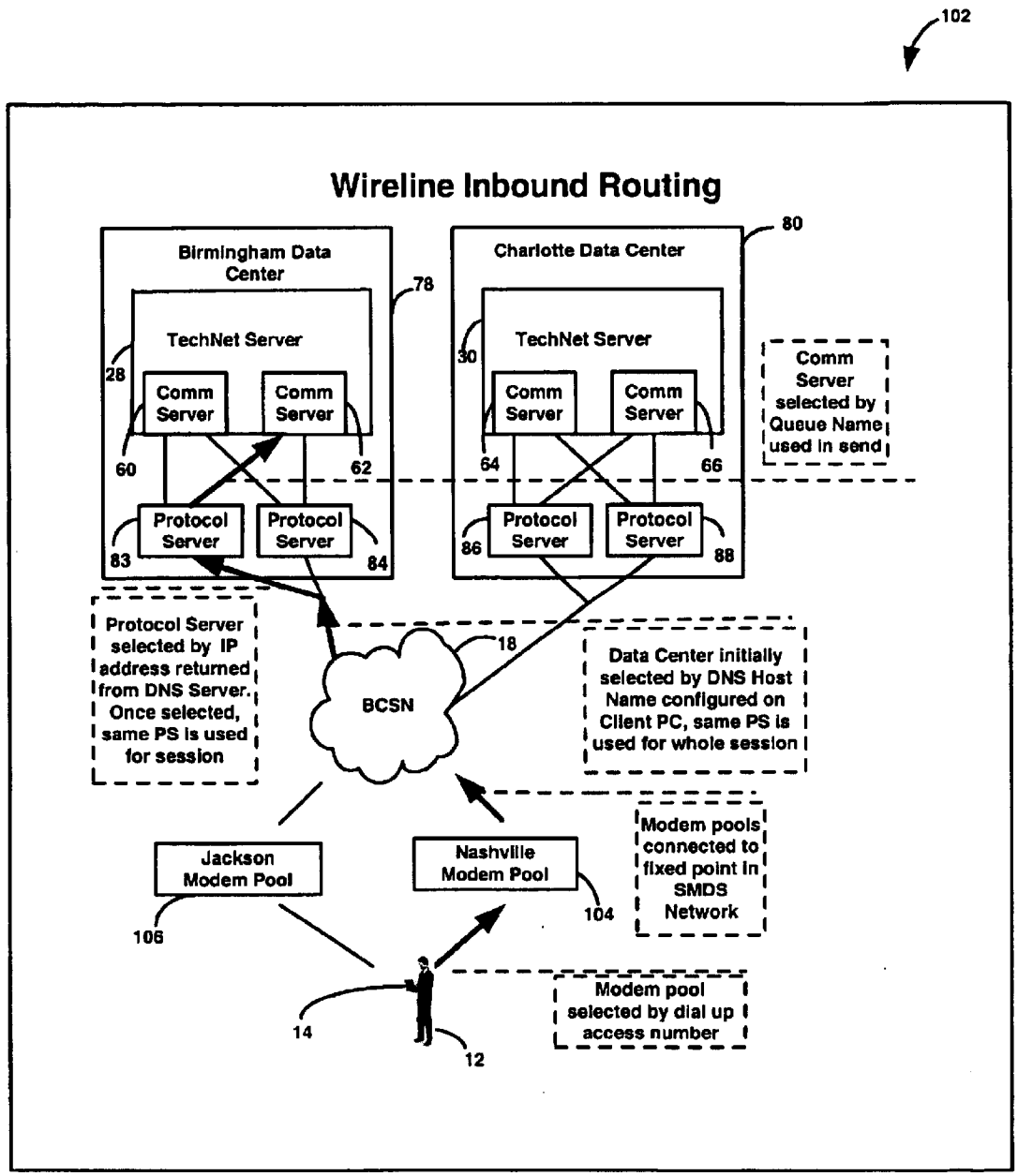
FIG. 11 shows a wireline inbound routing configuration.

FIG. 11 shows an illustration of wireline inbound routing 102. The technician 12 connects to dial tone and dials a dial-up access number. A modem pool 104 supporting the dial-up access number is selected. The modem pools 104, 106 are connected to a fixed point in the BSCN 18 network. The protocol server 83 selected by an IP address returned from DNS server is the same protocol server 83 used for the entire session. Likewise, the data center 78 initially selected by the DNS host name configured on the portable PC 14 utilizes the same protocol server 83 for the entire session. The comm server 62 of the TechNet server 28 is selected by the queue name used in the send command from the portable PC 14. Under normal operations, the portable PC 14 logs into a protocol server 83 using the current users' ID and the users' primary protocol server host name. The primary host name is used to specify the users' designated protocol server array 24, 26 in one of two data centers 78, 80. The wireline network and the middleware coordinates the assignment of a specific protocol server 83 from within the protocol server array 24, 26 specified by the host name.

Figure 12:
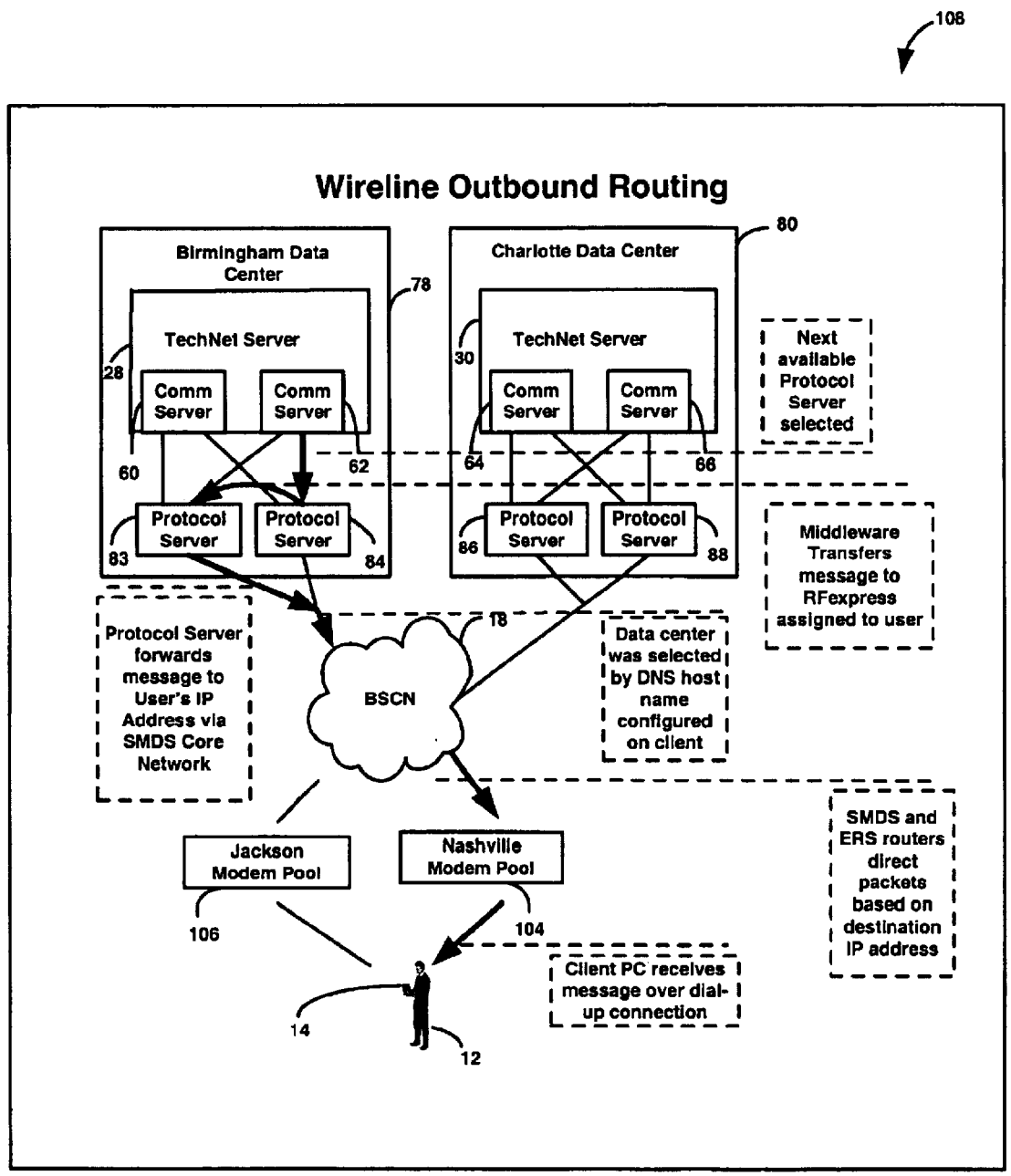
FIG. 12 shows a wireline outbound routing configuration.

FIG. 12 shows an illustration of wireline outbound routing 108. The TechNet server 28 selects the next available protocol server. Middleware transfers the message to the RFexpress assigned to the user. The protocol server 83 forwards the message to the users' IP address via the BSCN 18 network. The data center 78 selected by the DNS host name is configured on the portable PC 14. The BSCN and ERS routers direct packets based on destination IP addresses. Ultimately the portable PC 14 receives the message over a dial-up connection. Messages sent to the TechNet server 28 are addressed to the specified TechNet server queue name. Messages sent from the TechNet server 28 to the remote user 12 need only be addressed to the specific user ID. The middleware 42 routes messages to the correct protocol server 83 and on to the designated user.

3. Protocol Servers

Figure 13:
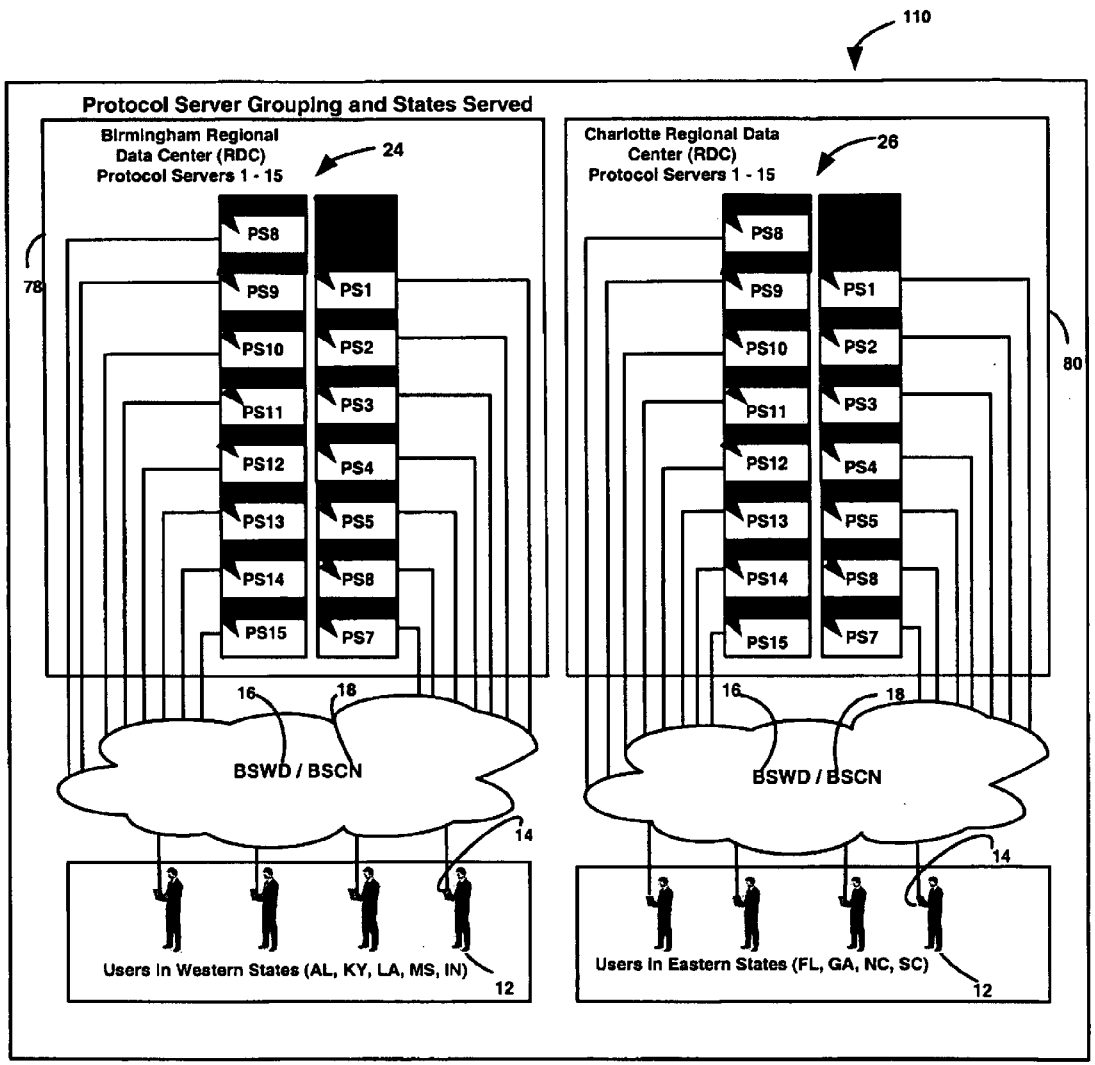
FIG. 13 shows an illustration of protocol server grouping.

Protocol servers 24, 26, 83, 84, 86, 88 are responsible for receiving sending data from/to the wireless 16 and wireline 18 networks and routing that data to the TechNet servers 28, 30. FIG. 13 shows an illustration of protocol server grouping 110. As shown in FIG. 13, preferably an array fifteen individual protocol servers 24, 26 are configured to handle traffic for a data center 78, 80 for a total of thirty protocol servers. These thirty protocol servers can handle requests from approximately 15,000 technicians. This invention provides a novel arrangement for providing reliable service and back-up capabilities to such a large number of remote users. The protocol server is implemented using RFexpress middleware from NetTech Systems.

Figure 14:
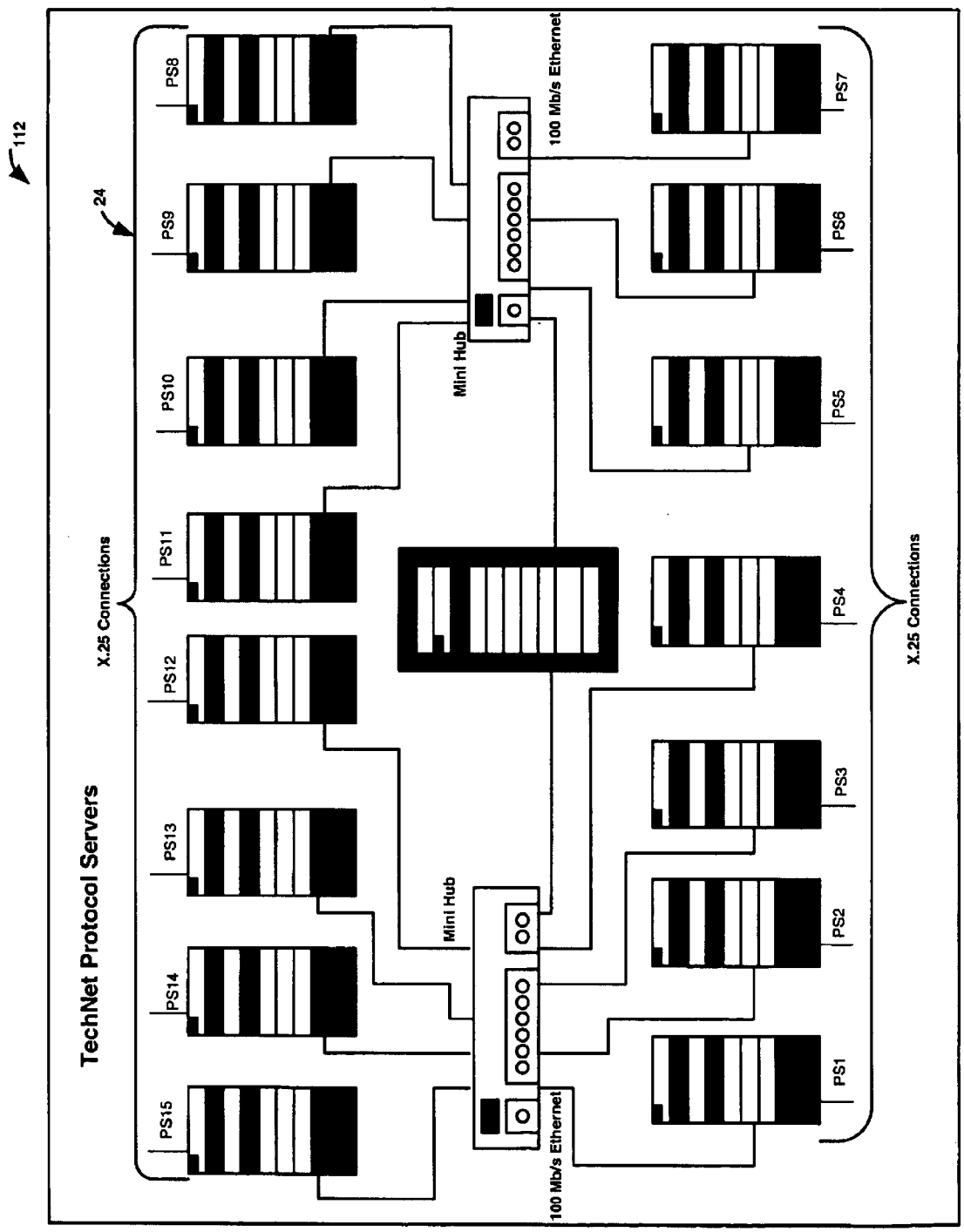
FIG. 14 shows a more detailed view of a configuration of the array of protocol servers of FIG. 13.

The protocol servers 24, 26 are arranged in two separate arrays of individual protocol servers. FIG. 14 shows in more detail the architecture of the array of fifteen individual protocol servers 112. This distributed architecture provides for geographical diversity of server sites, as well as diversified routing of traffic. The protocol server architecture 112, allows for distribution of traffic across multiple, lower cost servers and interfaces to the wireless 16 and wireline networks 18. In addition, multiple protocol servers provides a greater degree of fault tolerance, since each protocol server 24, as well as the connection to the wireline 16 and wireless 18 networks are redundant.

The TechNet protocol servers 24, 26 are primarily intended to conduct the flow of data between the TechNet servers 28, 30 and technicians 12, whether they be connected via wireless 16 or dial-up connections 18. Along with this primary function, the protocol server middleware 82 also provides the following functions: security, maintains addressing information for remote users, data compression, encryption and key management, network monitoring, and a single queue for outbound messages.

Figure 15:
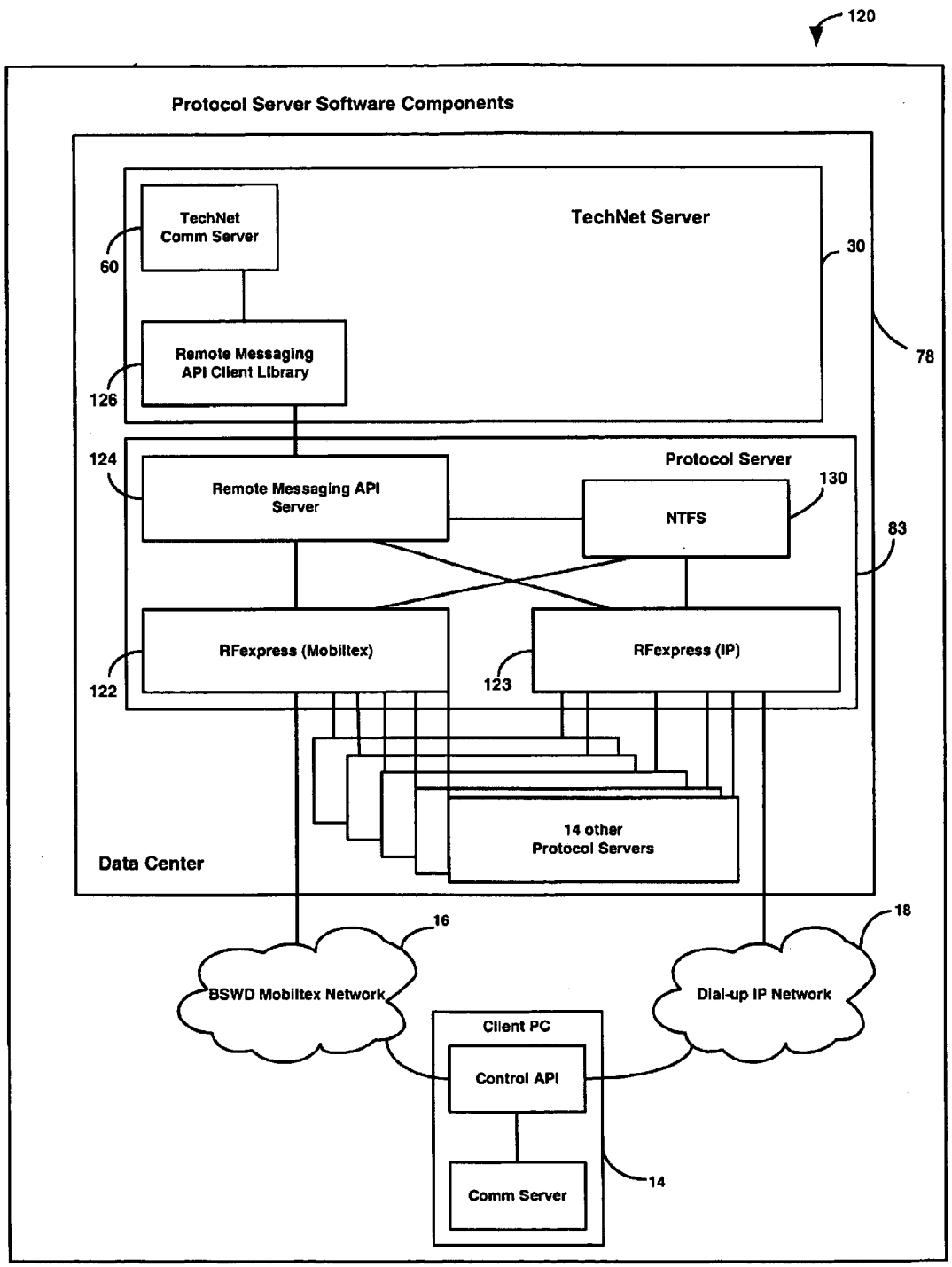
FIG. 15 shows an illustration of the protocol server architecture.

The middleware system 42 utilized by the protocol server involves several different software components that cooperate to perform the tasks of the protocol server 83 system. FIG. 15 shows an illustration of the protocol server architecture 120 as utilized in the TechNet System 10. The components of the middleware system 42 include the RFexpress 122, 123 server, a remote messaging API server 124, a remote messaging API client 126 and the message queue.

The RFexpress server software is responsible for transmitting data from the message queue to both the wireless 16 and wireline 18 networks. A separate instance of RFexpress 122, 123 is required to support each of the external networks, that is, one for the wireless network and one for the wireline network.

The remote messaging API server 124 resides on the protocol server 83. The remote messaging API server 124 is responsible for providing communications with the TechNet server 30 via the remote messaging API client 126. The remote messaging API client 126 resides on the TechNet server 30, and is responsible for communicating with the remote messaging API server 124 on the protocol servers 83. A NTFS file server 130 couples to the remote messaging API server 124 and is shared among a cluster of three protocol servers 83 for optimal utilization. A single instance of the remote messaging API client 126 library, with multiple connections to the remote messaging API server 124 on each protocol server 83, provides a single interface for the TechNet 32 server to the protocol server array 24. The remote messaging API server 124 is also responsible for transmitting messages between the remote messaging API client 126 and the message queue.

The message queue is used to store all outgoing messages, from the TechNet server 30 to the portable PC 14 until the protocol server 83 responsible for sending the message retrieves it. The message queue resides in a flat file system on the TechNet server 30 host, and is accessible to the protocol servers 83 via NTFS file system client software.

Figure 16:
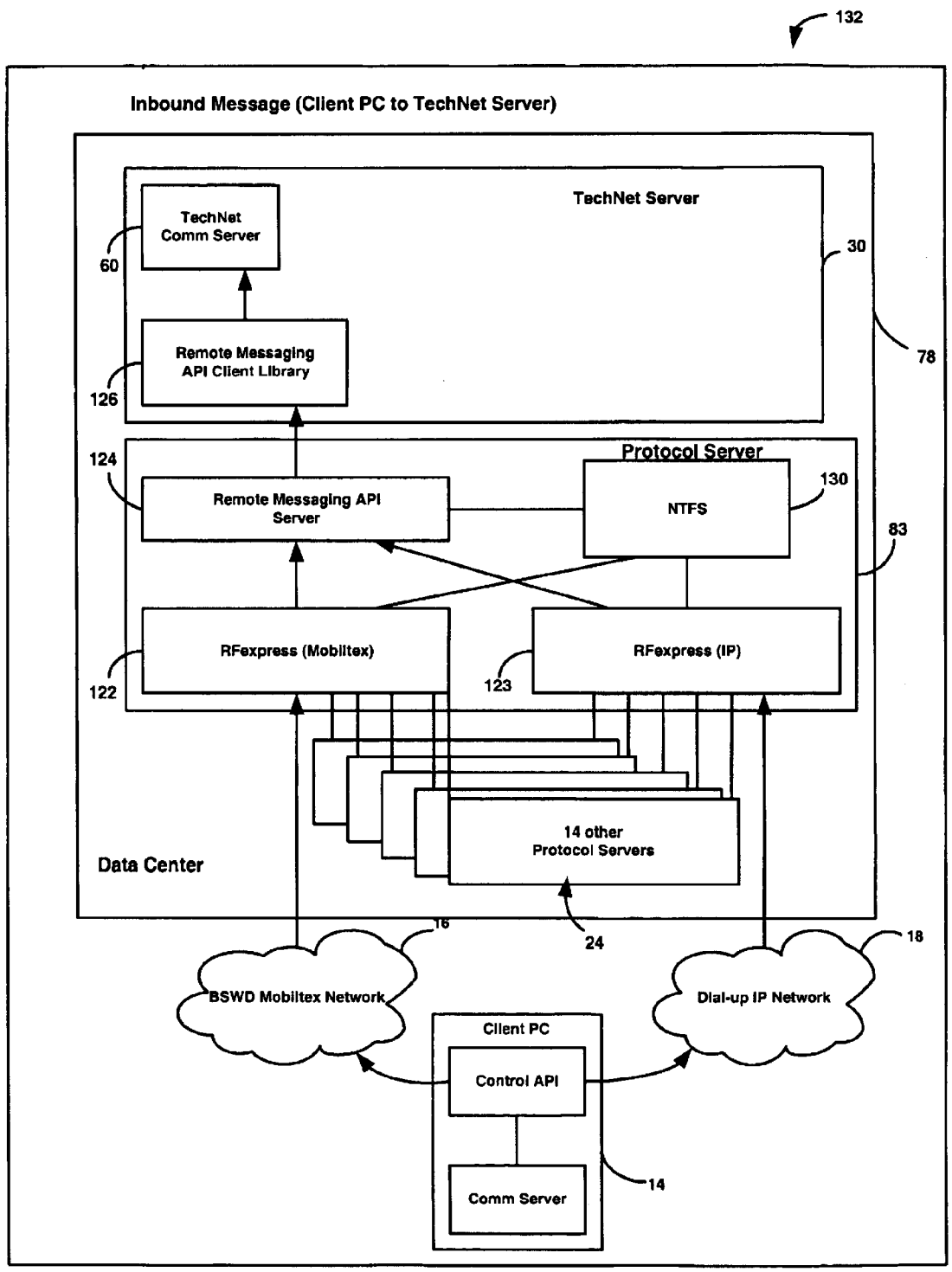
FIG. 16 shows an illustration of inbound message processing utilizing the protocol server architecture of FIG. 14.

FIG. 16 shows an illustration of inbound message processing 132. Messages arriving from the wireless 16 and wireline 18 networks are processed as follows. A message from the portable PC 114 remote user is received at the protocol server 83. For wireless messages, the message is preferably received via an Eicon X.25 card. For wireline messages, for example, the message is preferably received via an Ethernet connection. The RFexpress server 122, 123 responsible for the wireless or wireline network reads the message from the communications network. RFexpress server 122, 123 forwards the message directly to the remote messaging API server 124 on the local protocol server 83. The remote messaging API server 124 transmits the message to the remote messaging API client 126 on the TechNet Server 30. A NTFS file server 130 couples to the remote messaging API server 124 and is shared among a cluster of three protocol servers 83 for optimal utilization. The comm server 60 on the TechNet server 30 receives the message through a call to the remote messaging client library 126.

Figure 17:
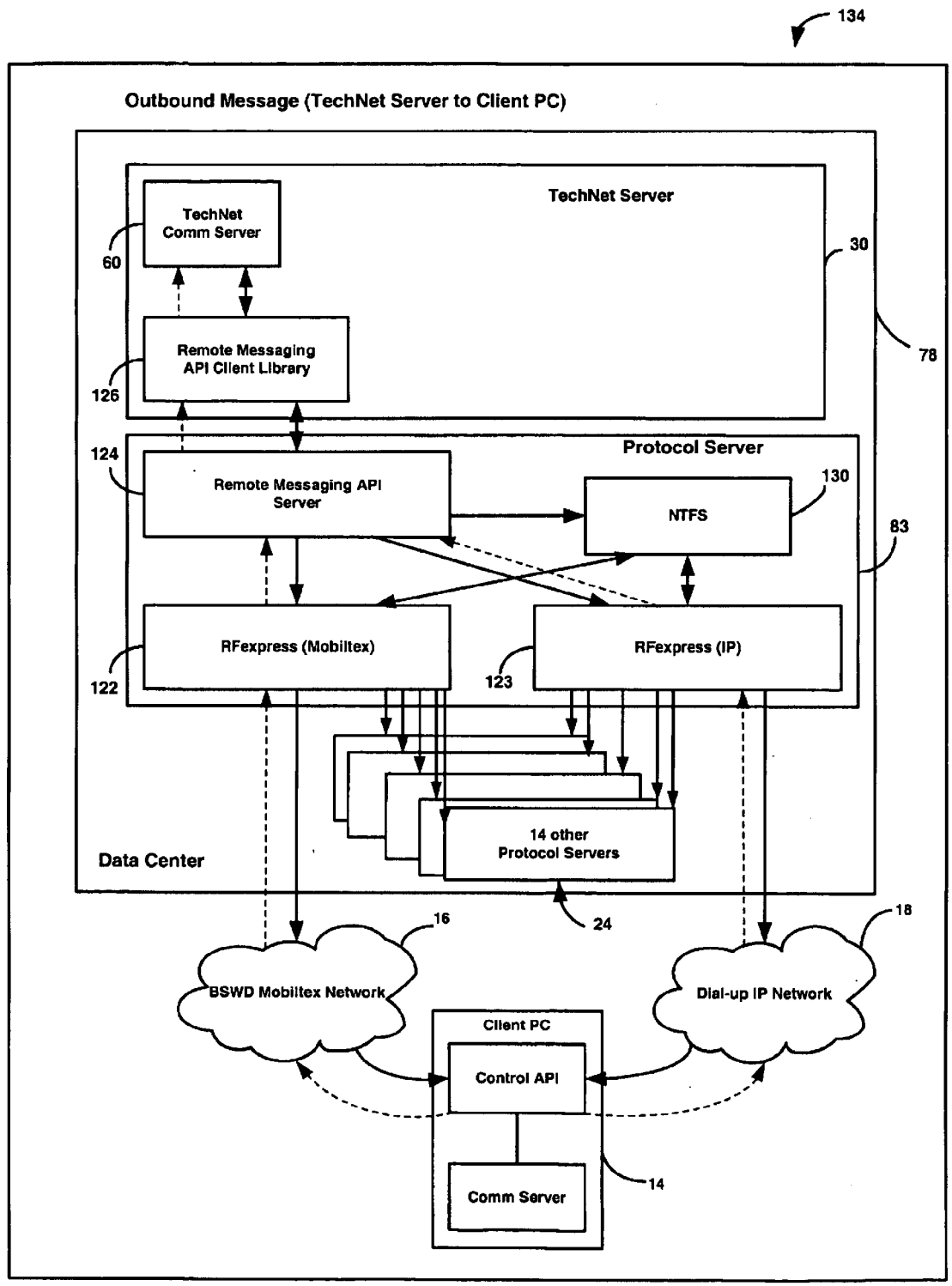
FIG. 17 shows an illustration of outbound message processing utilizing the protocol server architecture of FIG. 14.

FIG. 17 shows an illustration of outbound message processing 134. The comm Server 60 on the TechNet server 30 makes a call to the remote messaging API client library 126, specifying the message to be sent. The remote messaging API client library 126 forwards the request to one of the available remote messaging API servers 124 residing on the protocol server 83. The remote messaging API server 124 places the message in the destination users' directory in the message queue. All thirty instances of the RFexpress 122, 123 server are notified (via named pipe message) that a new outbound message is available. The instance of RFexpress server 122, 123 (residing on one of the other protocol server) that is responsible for the destination user retrieves the message from the message queue. The RFexpress server 122, 123 transmits the message to the remote user, including retries. The message will eventually be either transmitted successfully, or will fail all retries. If the message fails retry attempts, the user is logged off. When the message is successfully delivered the message is deleted from the message queue. A notification of the message status is returned to the TechNet server 30.

C. TechNet Server

Figure 18:
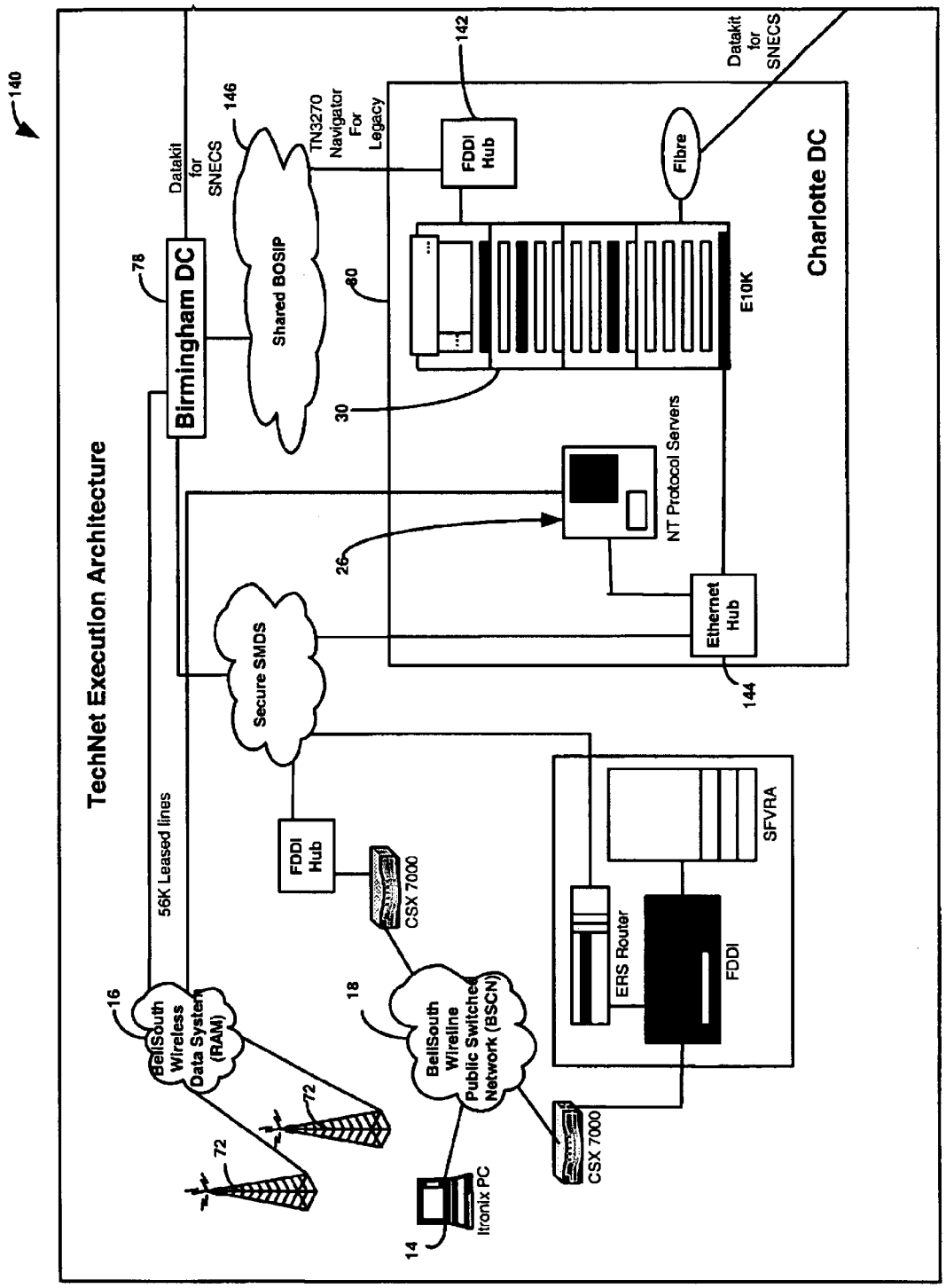
FIG. 18 shows an overview of an arrangement of TechNet servers deployment.

FIG. 18 shows an overview of an arrangement 140 the preferred TechNet server 28, 30 deployment. The TechNet servers 28, 30 come equipped with FDDI 142 and Ethernet cards 144, which allow the TechNet servers 28, 30 to connect to a BellSouth open systems interconnect platform (BOSIP) and the local network in the data centers. BOSIP, a communications link to the legacy systems, provides a backbone TCP/IP network. The local network may provide the TechNet server 28, 30 access to the protocol servers 24, 26 (depending on their location in the data center). Support and monitoring systems also need local network access to the TechNet servers 28, 30.

Figure 19:
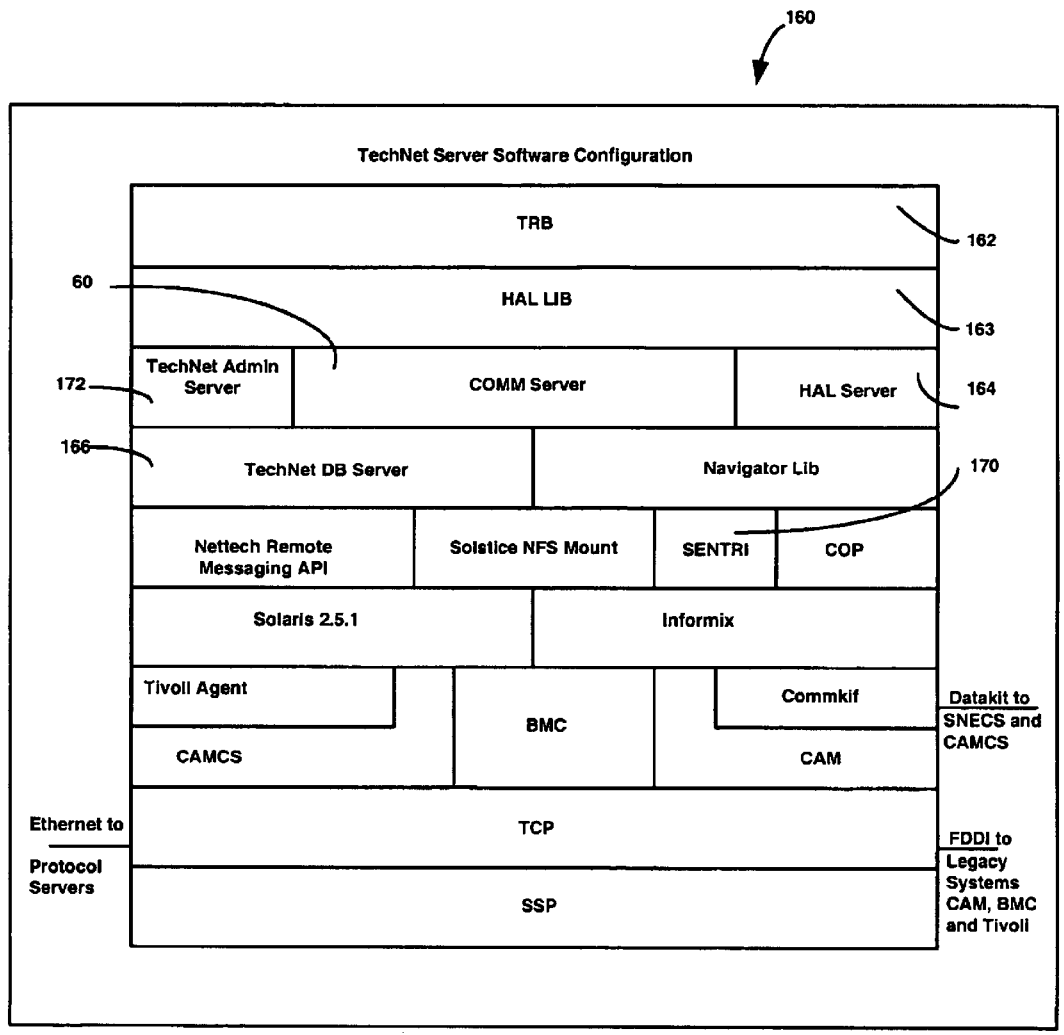
FIG. 19 shows an illustration of a TechNet server software configuration.

FIG. 19 shows the TechNet server software configuration 160. Software components include the communications service 60, Transaction Request Broker (TRB) 162, Hands Off Assignment Logic (HAL) library 163 and server 164, database 16, report server, Server Environment/Task Routing Interface (SENTRI) 170, and administration server 172.

The TechNet server 28, 30 complexes in both data centers, according to the preferred embodiment has the capacity (I/O, CPU, data storage, etc.) to service the entire field technician work force of about 15,000 technicians 12. The databases between the two TechNet servers 28, 30 are synchronized periodically. This reduces the network traffic and provides an acceptable window for disaster recovery situations. Alternatively, an architecture encompassing more than two TechNet servers 28, 30 is within the scope of this invention.

1. Communications Server

Once a message is placed in a socket of the TechNet servers' Input/Output (I/O) port 58 the comm server 60 recognizes the message and places it in the receive queue (store and forward).

The comm server 60 is one of the many different processes running on the TechNet servers 28, 30. The comm server 60 has a block on I/O activity of all the sockets of TechNet servers' I/O ports 58 connected to the protocol servers 24, 26. Once a message is placed on the socket, the comm server recognizes the message and places in the Receiver queue (store and forward type of message management).

2. Transaction Request Broker

Most of the business logic related to the system server resides on the Transactional Request Broker process (TRB) 162. The TRB 162 gets the message from the receive queue and processes it. TRB 162 processes the message, authenticates the user/PC combination, verifies users' logon status, and determines legacy system requests to be initiated for the transaction. For user authentication, TRB accesses a TechNet database, that contains user profile information. Further, TRB 162 makes these requests through predefined contracts to a HAL 164 or directly to the legacy systems 5. All the requests are also logged for administration and management purposes.

3. Hands Off Assignment Logic

Figure 20:
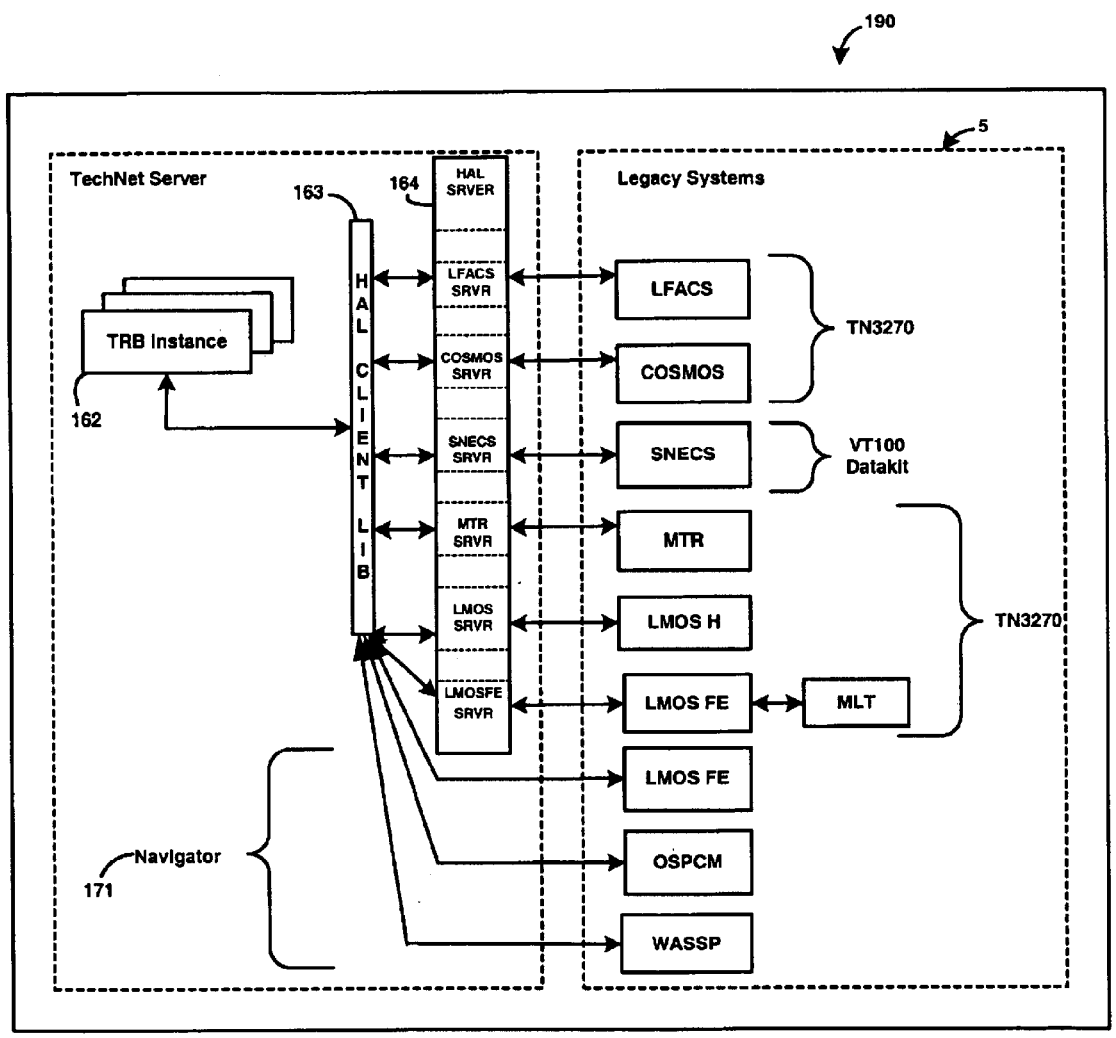
FIG. 20 shows a flow diagram of a Hands Off Assignment Logic (HAL) interface to legacy systems.

FIG. 20 shows a flow diagram of a Hands Off Assignment Logic (HAL) interface to legacy system 5, which interface comprises library 163 and server 164. Hal library 163 comprises components that abstract the transport and data mapping to the legacy system. HAL server 164 is a process that manages sessions with the legacy system and provides a screen scraping interface between TRB 162 and legacy systems 5. HAL 163/164 serve as a shield for TRB 162 against any legacy system changes unrelated to the TechNet system 10. HAL library 163 and an instance of HAL process 64 running on the TechNet servers 28, 30 receive requests from TRB 162 and invoke legacy system transaction. These transactions can be TN3270 sessions, Navigator contracts or DataKit sessions (depending on the legacy transaction to be invoked).

Once the request has been completed, the HAL 164 interface provides information back to the TRB 162 process. The TRB 162 places this information in the send queue, along with sender and receiver information. The comm server 60 picks up the message and places it back on one of the I/O sockets 52, 54, 56.

4. Request completion

Request completion utilizes a middleware process that has a clock on the socket 52, 54, 56 I/O activity picks up the message and places it in the senders' queue. Another middleware process determines the destination address of the sender (who initiated the request), and sends the message back to the portable PC 14 via the communications network 16, 18. The portable PC 14 receives the message and displays the results to the user.

5. Administration server

The Administration Server 172 (Admin Server), (also called the GUI-Server Agent GSA) is a web-based server process that provides remote access to TechNet System administrators. This system consists of technician data required by TechNet applications and the tools necessary to maintain the data and produce reports.

Through this process, the TechNet Administrators can use a web browser to access JAVA applets to perform administrative services. This process has access to the various databases, flat files, and monitoring processes maintained by the TechNet system.

6. Data Base server and report server

The TechNet System 10 can maintain user profiles having access authorization and logs transactions for performance and auditing purposes. The database server 166 is one of the processes running on the TechNet server 28, 30 and provides access to the database. The report server collects any return data needed for selected reports.

7. Server Environment/Task Routing Interface.

Server Environment/Task Routing Interface (SENTRI) 170 is a process controller. SENTRI becomes active at boot time and monitors all the other server processes. It logs process activities and restarts a troubled processes.

8. Terminal Emulation

Terminal emulation provides a unique emulation and/or screen scraper function that shields the system from interface changes made to a legacy system. Traditional emulation and screen scrapers serve to mimic functions that would be performed by a user directly accessing a particular system. This function can limit a systems capability by requiring constant updating if the look and feel of the interface changes. Thus, this invention provides a separate and distinct interface to certain legacy systems that avoids having to change each time an interface changes.

9. Navigator

A major limitation of the existing CAS system is that access to legacy systems is through terminal emulation, such as screen scraping. Additionally, every message from a technician is processed individually. Thus, for each message received, the CAS servers would individually route the messages to the appropriate remote system and would also individually route each reply message returned to the technicians. Rather than screen scraping or other terminal emulation, the system preferably provides a more direct connection to certain legacy and other remote systems. For instance, the system preferably connects to LMOS and OPSCM through Navigator 171 that allows an efficient, effective access to LMOS and OPSCM without concern for changes to legacy Systems. The Navigator tool kit provides a messaging service delivering blocks of LMOS data to the TechNet server 28, 30. Currently, approximately 80% of the technician 12, customer premises work involves dispatching to correct troubles and to complete service orders. Thus, Navigator 171 access to LMOS increases technicians' ability to efficiently perform job duties.

FIG. 21 shows a representative example of TechNet Server components in each data center. Any equivalent component can be substituted for any of the above listed components listed in FIG. 21.

It is envisioned that this invention will provide the described capabilities to technicians and the following enhancement features: immediate input and close-out of customer service requests; capture of customer signatures electronically; acceptance of credit card payments for installation of new services or repairs; automation of monthly mileage reports and motor vehicle repair requests; ordering materials and supplies; capabilities for technicians to train themselves on new services and procedures using a CD-ROM disk; access to e-mail, network construction data, and cable planning documents; and printing out a customer statement for services rendered, product information, job aids, customer instructions on the features and services installed and access an intranet.

An advantage of this invention is that it provides technicians with remote access to remote systems such as legacy systems via a wireless communications network.

Another advantage of this invention is that where navigator is employed, the system is shielded from interface changes made to legacy systems.

The forgoing description of the preferred embodiments of the invention has been presented only for the purpose of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated.

What is claimed is:

1. A method of accessing legacy systems comprising the steps of:

receiving at a broker a message requesting legacy systems data;

determining by the broker which legacy systems provide the requested data;

generating by the broker one or more data requests, depending on which legacy systems provide the requested data, and sending the data requests to an interface process;

based on the data requests, conducting at the interface process legacy system transactions with the determined legacy systems to retrieve the data;

forwarding by the interface process to the broker the data retrieved from the determined legacy systems; and formatting at the broker the data into a reply message.

2. The method of claim 1 wherein the conducting step further comprises the steps of:

receiving information from each of the determined legacy systems; and screen scraping the received information in order to retrieve the requested data.

3. A system for providing access to legacy systems, said system comprising:

a transaction request broker; and an interface process;

wherein said transaction request broker receives a first message requesting legacy system data, determines which legacy systems provide the data and generates one or more data requests to the interface process, based on which legacy systems provide the requested data;

wherein said interface process receives the data requests from said transaction request broker, conducts transaction sessions with the legacy systems based on the data requests in order to retrieve the data, and upon completion of the sessions returns the data to said transaction request broker; and wherein said transaction request broker further collects the data returned by said interface process and formats the returned data into a reply message.

4. The system of claim 3 wherein said interface process performs screen scraping.

5. The system of claim 3 further comprising a database that maintains user profile information, and wherein said transaction request broker uses said information to authenticate said first message.

6. The system of claim 3 further comprising a performance management process controller that logs activities of system processes and restarts non-functioning processes.

7. The system of claim 3 further comprising one or more non-legacy systems, wherein said transaction request broker further receives a second message specifying non-legacy data from said non-legacy systems.

* * * * *